(12) United States Patent
Hsieh et al.

(10) Patent No.: US 9,976,055 B2
(45) Date of Patent: May 22, 2018

(54) LOWER TEMPERATURE CURE COATING COMPOSITIONS

(71) Applicant: KING INDUSTRIES, Norwalk, CT (US)

(72) Inventors: Bing Hsieh, Ridgefield, CT (US); Ramanathan Ravichandran, Suffern, NY (US); Robert Coughlin, Norwalk, CT (US); Farouk Abi-Karam, Wilton, CT (US); Marvin Blair, Bloomfield, CT (US)

(73) Assignee: King Industries, Norwalk, CT (US)

( * ) Notice: Subject to any disclaimer, the term of this patent is extended or adjusted under 35 U.S.C. 154(b) by 0 days. days.

(21) Appl. No.: 14/594,087

(22) Filed: Jan. 10, 2015

(65) Prior Publication Data

US 2015/0197665 A1    Jul. 16, 2015

Related U.S. Application Data

(60) Provisional application No. 61/926,367, filed on Jan. 12, 2014.

(51) Int. Cl.
| | | |
|---|---|---|
| *C09D 167/00* | (2006.01) | |
| *C09D 175/04* | (2006.01) | |
| *C09D 133/00* | (2006.01) | |
| *C09D 175/00* | (2006.01) | |

(52) U.S. Cl.
CPC ......... *C09D 175/04* (2013.01); *C09D 133/00* (2013.01); *C09D 167/00* (2013.01); *C09D 175/00* (2013.01)

(58) Field of Classification Search
CPC .. C09D 175/04; C09D 133/00; C09D 167/00; C09D 175/00
See application file for complete search history.

(56) References Cited

U.S. PATENT DOCUMENTS

| | | | | |
|---|---|---|---|---|
| 2,704,750 A | * | 3/1955 | Whitehill | C08G 12/42 525/509 |
| 2,978,437 A | | 4/1961 | Christenson | |
| 2,979,514 A | | 4/1961 | O'Brien et al. | |
| 3,037,963 A | | 6/1962 | Christenson | |
| 3,079,434 A | | 2/1963 | Christenson et al. | |
| 3,674,838 A | | 7/1972 | Nordstrom | |
| 4,100,137 A | * | 7/1978 | Lemieux | C08K 5/07 525/154 |
| 4,126,747 A | | 11/1978 | Cowherd et al. | |
| 4,279,833 A | | 7/1981 | Culbertson et al. | |
| 4,301,257 A | | 11/1981 | Zengee et al. | |
| 4,340,497 A | | 7/1982 | Knopf | |
| 4,734,467 A | | 3/1988 | Mitsuo et al. | |
| 4,758,632 A | | 7/1988 | Parekh et al. | |
| 4,761,441 A | * | 8/1988 | Woodson | C08L 61/00 523/439 |
| 4,968,775 A | | 11/1990 | Toman et al. | |
| 5,068,273 A | * | 11/1991 | Patel | C08K 5/42 524/166 |
| 5,300,328 A | | 4/1994 | Rehfuss | |
| RE34,730 E | | 9/1994 | Salatin et al. | |
| 5,356,669 A | | 10/1994 | Rehfuss et al. | |
| 5,380,816 A | | 1/1995 | Sullivan | |
| 5,563,223 A | | 10/1996 | Hiroshi et al. | |
| 6,177,514 B1 | | 1/2001 | Pathak et al. | |
| 6,413,648 B1 | | 7/2002 | Heyenk et al. | |
| 6,897,265 B2 | | 5/2005 | Algrim et al. | |
| 8,431,730 B2 | | 4/2013 | Abi-Karam et al. | |
| 2003/0050432 A1 | * | 3/2003 | Ramesh | B01F 17/005 528/354 |
| 2009/0104353 A1 | * | 4/2009 | Shaw | C23C 16/20 427/255.28 |

FOREIGN PATENT DOCUMENTS

EP    0380466 A2    8/1990

OTHER PUBLICATIONS

P. Adams & F. Baron, "Esters of Carbamic Acid", Chemical Review, V. 65, 1965.
Extended European Search Report for corresponding application EP15735575.1, dated Nov. 28, 2017, 7 pages.

* cited by examiner

*Primary Examiner* — John E Uselding
(74) *Attorney, Agent, or Firm* — Ohlandt, Greeley, Ruggiero & Perle, L.L.P.

(57) ABSTRACT

Select metal salts of mono and di aromatic sulfonic acids and aliphatic sulfonic acids are effective latent acid catalysts in coating compositions capable of acid catalyzed crosslinking and provide coating compositions with lower cure temperature and quicker cure times than encountered with conventional sulfonic acid catalysts, have excellent storage stability and avoid drawbacks of epoxy and amine blocked sulfonic acid catalysts.

18 Claims, No Drawings

LOWER TEMPERATURE CURE COATING COMPOSITIONS

This application claims benefit under 35 USC 119 of the filing date of U.S. Provisional Application No. 61/926,367 filed Jan. 12, 2014, the entire contents of each disclosure are incorporated herein by reference.

FIELD

Provided herein are coating compositions comprising one or more select metal sulfonate catalysts, effective for coating e.g., primed or unprimed metal or plastic surfaces, which coating compositions are curable at lower temperature and with a shorter cure time than similar coating compositions comprising traditional epoxy or amine blocked sulfonic acid catalysts.

BACKGROUND

Industrial coating compositions are used in a wide variety of applications, including application directly to metal, to primed metals and a number of other materials including plastics etc. Both liquid and powder coatings are common and are applied by a variety of methods including, for liquids, electrodeposition, spraying, extruding, plate coating, dipping, and coil coating etc., and for powders, cloud chamber, plasma coating, electrostatic deposition and the like. Coating films having a thickness of from 0.01 and 5 mils are typically employed.

The conditions under which coatings are applied, and the conditions under which they are cured vary widely. For example, the coating can be applied under ambient conditions but higher temperatures are often used and temperatures up to about 450° F. (232° C.), or higher are employed during application. Cure temperatures also vary widely, and depending on the coating composition temperatures of up to 400° C. and higher, e.g., from about 60° C. to 400° C., may be encountered. The length of time required for cure can also vary, e.g., from about 10 sec. to about 60 minutes is typical.

Coatings that cure more efficiently, i.e., quickly, and which use less energy, i.e., cure at lower temperatures, are generally in demand.

The present invention is directed to a coating composition that cures at lower temperature and with shorter cure times than other currently used coatings due to the presence of select metal sulfonate catalysts, and to a method for decreasing the bake temperature and cure or dwell time of a coating process by utilizing a coating composition comprising metal sulfonate catalysts. The catalysts disclosed in this invention are effective in a number of industrial coating applications including automotive coatings and coatings over temperature sensitive substrates such as plastics.

Coil coatings are an example of one important industrial coating application. Coil coatings are applied to coiled sheet metal stock, such as steel or aluminum, in an economical, high speed process. The coil coating process results in a high quality, uniform coating with little waste of the coating and little generation of organic emissions as compared to other coating methods, e.g. spray application of a coating composition.

Coil coating is a continuous feeding operation, with the end of one coil typically being joined (e.g., stapled) to the beginning of a next coil. The coil is first fed into an accumulator tower and after coating is fed into an exit accumulator tower, with the accumulator towers allowing the coating operation to continue at constant speed even when intake of the steel is delayed, for example, to start a new roll, or winding of the steel after coating is delayed, for example, to cut the steel to end one roll and begin a new roll. The coil is generally cleaned to remove oil or debris, pre-treated, primed with a primer on both sides, baked to cure the primer, quenched to cool the metal, and then coated on at least one side with a topcoat. A separate backer or a different topcoat may be applied on the other side. The topcoat is baked and quenched, then fed into the exit accumulator tower and from there is re-rolled.

One of the controlling factors for the coil coating line speed is the oven dwell time necessary to cure the applied coating at the cure oven temperature. A coating composition that can be cured in a shorter time at cure temperature allows a faster and more economical coil coating process. A number of other properties are also important for coil coatings, such as resistance to degradation on outdoor exposure (weatherability), chemical resistance, water resistance, scratch resistance, gloss, hardness, and resistance to delamination when the substrate is bent. The bending property is important because after being coated the metal is subjected to a forming step. For example, building panels are formed into a three-dimensional shape after coating. It is important that the coating not lose adhesion during the forming step or steps. Weatherability is important for metal that will be used for building panels, gutters, garage doors, sign stock, panels used for vehicle parts, or other such uses where the coated surface is exposed to outdoor weather and sun. While the bending property is generally better with softer, more flexible binders, weatherability and other durability properties are generally better with harder binders.

In the coil coating operation, a coil of sheet metal is uncoiled as it is pulled through a series of rollers, one or more of which is a paint applicator roller, at up to about 600 feet per minute. It is then passed through a curing oven and coiled again for the market. The paint is picked up by a roller rotating in the paint pan and transferred to a reverse or direct applicator roller. The cure temperature in a coil coating operation is typically measured as a peak metal temperature (PMT). The peak metal temperature is generally between 425° F. (218° C.) and 525° F. (274° C.).

Various coil coating compositions providing different coating properties are known. For example U.S. Pat. No. 6,413,648 discloses a thermosetting coating composition containing a mixture of two polymers selected from linear or branched polyacrylates or polyesters, one of which is amorphous with a glass transition temperature greater than about 45° C.

U.S. Pat. No. 5,563,223 discloses a coil coating composition that balances processability of the coating with the need for alkali resistance, gasket resistance, weatherability and resistance to staining after cure, the composition comprising a curing agent and a polyester prepared from an acid component that is at least 50 mole % aromatic dicarboxylic acid and a glycol component having 1-25 mole % 2-methyl-1,3-propanediol and 75-99 mole % alkylene glycol having 5 to 10 carbon atoms. Alternatively, the glycol component can be 20-85 mole % of alicyclic glycol, 80-15 mole % of the addition product of bisphenol A and alkylene oxide, and up to 50 mole % of other glycol(s).

U.S. Pat. No. 5,380,816 discloses thermoset coating compositions comprising linear polyesters consisting essentially of recurring units of isophthalic acid, an aliphatic diol component including 2-methyl-1,3-propanediol, and, optionally a further dicarboxylic acid. The cured coating reportedly has improved flexibility and hardness, although it requires a relatively long cure time for a coil coating.

U.S. Pat. No. 4,968,775 discloses a thermosetting coil coating composition resistant to crystallization comprising an aminoplast resin and a polyester prepared by condensation of 2-methyl-1,3-propanediol, neopentyl glycol, isophthalic acid, and terephthalic acid, and may contain 1,6-hexanediol or other symmetrical glycol, trimethylolpropane, adipic acid or other symmetrical aliphatic dicarboxylic acid, and/or trimellitic anhydride.

U.S. Pat. No. 4,734,467 discloses a coil coating composition consisting essentially of a crosslinking component selected from melamine resin or isocyanate compound and a mixture of linear and branched polyester resins. The cured coating is reported to have desirable hardness, bending, processability, fastness to boiling water, weather resistance, chemical resistance, and marker stain resistance.

U.S. Pat. No. 6,897,265 discloses a coil coating composition with excellent properties applied at a lower peak metal temperature comprising (a) a first, branched polyester prepared from a polyol selected from a flexibilizing diol, 2-methyl-1,3-propanediol, and a polyol having at least three hydroxyl groups and isophthalic acid; (b) a second, linear polyester prepared from the polyol component selected from a flexibilizing diol and 2-methyl-1,3-propanediol and isophthalic acid; and (c) a crosslinking agents including, aminoplasts and isocyanates.

Catalysts are often employed in the curing of coiled coatings for example, conventional acid catalysts such as aromatic sulfonic acid catalysts, including napthalene disulfonic acid, dinonyl napthalene sulfonic acid, para-toluene sulfonic acid, and dececylbenzene sulfonic acid, other acids such as phosphate acid catalysts including phosphoric acid, and mono- and dibutyl acid phosphate may also be used. Blocked acid catalysts, such as epoxy and amine blocked sulfonic acid catalysts are also known, but often suffer from drawbacks such as popping or undue color development.

The attempts of the art cited above focused on adjusting the coating in order to provide lower temperature cure in order to prevent discoloration. However, these coatings still suffered from other drawbacks of the prior art including popping, amine migration and discoloration. The changing of the polymer chemistry did not address the problems with the catalyst.

U.S. Pat. No. 8,431,730, incorporated herein by reference, discloses latent sulfonate ester catalysts that offer improvement over the epoxy and amine blocked catalysts in coatings such as those comprising calcium anti-corrosive pigments, however, improvements in catalysts, generally useful in a variety of coil coatings are still needed.

Another example of an important industrial coating includes multi-layer coatings prepared by sequentially applying different functional layers, e.g., a primer surfacer, a base coat composition, and/or a clear coat composition, on a substrate in a wet-on-wet manner, and simultaneously curing the layers together in a single baking step. The resulting multi-layered coating film has excellent aesthetic appearance, strike-in resistance, chipping resistance, sag resistance, and film build even when formed in a three wet layered application method.

Composite color-plus-clear coatings are widely utilized multi-layered coatings. They are particularly desirable where exceptional gloss, depth of color, distinctness of image, or special metallic effects are required. The automotive industry has made extensive use of color-plus-clear composite coatings for automotive body panels.

Typically, composite color-plus-clear coatings are coating systems requiring the application of a first coating, typically a colored basecoat coating, followed by the application of a second coating, generally a clearcoat, over the noncured or "wet" first coating. The applied first and second coatings are then cured. Thus, such systems are often described as "wet on wet" or "two coat/one bake". Drying processes which fall short of complete cure may be used between the applications of the coatings. In many applications the base coat is applied to a primer surfacer typically comprising as a film forming binder a highly branched acrylic polymer having a hydroxyl, carboxyl and/or other crosslinkable functional group and an aminoplast resin crosslinking agent.

Clearcoats used in color-plus-clear systems must have an extremely high degree of clarity in order to achieve the desired visual effects. High gloss coatings also require a low degree of visual aberrations at the surface in order to achieve the desired visual effect such as high distinctness of image (DOI). As a result, clearcoats of color-plus-clear systems are especially susceptible to the phenomenon known as environmental etch, i.e., spots or marks on or in the clear finish that often cannot be rubbed out.

Surface imperfections and/or defects can occur during the multistep application process typically used to apply composite coatings. Such surface imperfections and/or defects are sometimes not repairable until after the curing of the composite coatings. In some instances, the repair process occurs subsequent to the addition of other components to a coated article. The additional components may have melting or deformation temperatures which are lower than the cure temperature of the original composite coating.

Ideally, it would be desirable to repair surface imperfections and/or defects with the original composite coating or components thereof, in order to obtain uniform appearance and performance properties over the whole of the coated article. In particular, it would desirable to have a repair coating which provides the same performance and appearance properties of the original composite coating or components thereof. However, the cure schedule for traditional composite coatings typically requires temperatures greater than the melt or deformation temperature of some article components added subsequent to the original composite coating application process.

Thus, there is a need for a curable coating composition suitable for use in low bake repair of color-plus-clear composite coatings or coating components thereof, in particular, one which can be used in low bake repair of color-plus clear composite coatings or components thereof, which provides desirable performance and appearance properties and cures at a temperature less than that of the cure temperature required for the original color-plus-clear composite coating.

It has been found that coatings containing metal sulfonate latent catalysts of the present invention can be beneficially used as coil coatings, as any or all of the layers in multi-layer coatings, curable coating compositions for use in low bake repair of color-plus clear composite coatings, etc., which coatings offer improvements in cure time, lower cure temperature and frequently better coating properties. The catalysts of the invention avoid the drawbacks of epoxy and amine blocked acid catalysts and provide benefits in a wide variety of coating applications.

SUMMARY OF THE INVENTION

Metal salts of mono and di aromatic sulfonic acids and aliphatic sulfonic acids are effective as latent acid catalysts in coating compositions capable of acid catalyzed crosslinking. Coating compositions comprising one or more of the metal sulfonate catalysts of the invention exhibit lower cure temperature and quicker cure times than encountered with conventional sulfonic acid catalysts, have excellent storage stability and avoid drawbacks of epoxy and amine blocked sulfonic acid catalysts. In certain compositions free sulfonic acids could be used in combination with the above metal sulfonate salts.

One embodiment of the invention provides a curable coating composition capable of acid catalyzed crosslinking and comprising at least one active hydrogen-containing resin, at least one curing agent present externally and/or internally as a part of the active hydrogen-containing resin, and a catalytic amount of one or more metal sulfonates of Formula (I) through (V), often in a ratio of sulfonate to sulfonic acid of 1:20 to 1:2, e.g., 1:20 to 1:1, or 1:5 to 1:1.

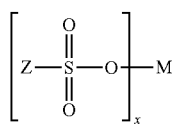

Formula (I)

wherein Z is an organic radical selected from the group consisting of linear, branched, saturated or unsaturated alkyl having from 1 to 40 carbon atoms, e.g., from 1 to 24 carbon atoms, cycloalkyl having from 5 to 40 carbon atoms, e.g., from 5 to 12 carbon atoms, which alkyl and cycloalkyl may optionally substituted, e.g., by halogen, aryl having from 6 to 40 carbon atoms, e.g. phenyl, biphenyl, naphthyl, anthryl, phenanthryl etc, aralkyl having from 7 to 9 carbon atoms, wherein the aralkyl optionally may be substituted with an alkyl having from 1 to 36 carbon atoms, and wherein the organic radical is connected to the sulfur atom by a carbon atom.

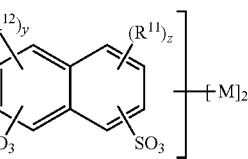

Formula (II)

wherein each of $R^{11}$ and $R^{12}$ independently are the same or different and are linear or branched alkyl having up to 40 carbon atoms, for example, from 6 to 40 carbons, e.g., from 6 to 24 carbon atoms, which may optionally be substituted by, e.g., halogen, y is 0 to 3, z is 0 to 3 with the proviso that y+z is 1 to 4.

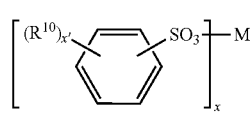

Formula (III)

wherein $R^{10}$ is an alkyl group having up to 40 carbon atoms e.g., from 1 to 24 carbon atoms, which may optionally substituted by, e.g., halogen; and x' is 1 or 2,

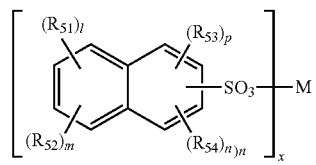

Formula (IV)

wherein $R_{51}$, $R_{52}$, $R_{53}$ and $R_{54}$ are independently selected from the group consisting of essentially linear or branched hydrocarbyl groups having up to 40 carbon atoms, e.g., about 6 to about 40 carbon atoms e.g., from 6 to 24 carbon atoms; 1, m, n and p are integers from 0 to 4 and the sum of l+m+n+p is at least 1;

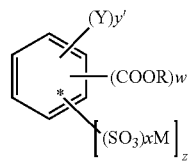

Formula (V)

wherein Y is a radical independently selected from the group consisting of alkyl having from 1 to 20 carbon atoms, cycloalkyl having from 3 to 20 carbon atoms, aryl having from 6 to 18 carbon atoms, halogen, alkoxy, hydroxyl, and aryloxy; y' is an integer from 0 to 4, w is an integer from 0 to 2, and z is an integer from 1 to 3, with the proviso that when w is 0, y is an integer from 1 to 4 and z is an integer from 2 to 3 and when y is 0, w is an integer from 1 to 2 and z is an integer from 1 to 3 and R is independently selected from the group consisting of hydrogen, alkyl having from 1 to 20 carbon atoms, cycloalkyl having from 3 to 20 carbon atoms, aryl having from 6 to 18 carbon atoms; and in each of the formula above, M is selected from, e.g., Li, Na, K, Be, Mg, Ca, Ba, Fe, Sc, Ti, Al, Zn, Zr, Cd, Hg, Sn, Mo, and W; and x is a number of from 1 to 6. There can be some complexity to some metal salts, and not all of the salts exist as a simple ratio of ligand to metal ion e.g., 1:1 or 2:1, but may have an empirical formula of e.g., 3 ligands per 2 metal ion. Thus it is possible in some embodiments for x to be an integer e.g., 1, 2, 3, 4, 5 or 6, and in other embodiments x may also be a fraction, such as 1.5, 2.5 etc.

Another embodiment provides a curable coating composition capable of acid catalyzed crosslinking comprising at least one active hydrogen-containing resin, at least one curing agent present externally and/or internally as a part of the active hydrogen-containing resin, and a catalytic amount of one or more metal sulfonates of Formula (I) through (V), in combination with free sulfonic acids of Formula (VI) through (X).

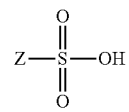

Formula (VI)

Wherein Z is a organic radical selected from the group consisting of linear, branched, saturated or unsaturated alkyl having from 1 to 40 carbon atoms, cycloalkyl having from 5 to 40 carbon atoms, aryl having from 6 to 40 carbon atoms, aralkyl having from 7 to 9 carbon atoms, wherein the aralkyl optionally may be substituted with an alkyl having from 1 to 36 carbon atoms,

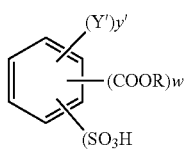

Formula (VII)

Wherein Y' is a radical independently selected from the group consisting of alkyl having from 1 to 20 carbon atoms, cycloalkyl having from 3 to 20 carbon atoms, aryl having from 6 to 18 carbon atoms, halogen, alkoxy, hydroxyl, and aryloxy; y' is an integer from 0 to 4, w is an integer from 0 to 2, and x is an integer from 1 to 3, with the provisos that when w is 0, y' is an integer from 1 to 4 and when y' is 0, w is an integer from 1 to 2; R is independently selected from the group consisting of hydrogen, alkyl having from 1 to 20 carbon atoms, cycloalkyl having from 3 to 20 carbon atoms, aryl having from 6 to 18 carbon atoms.

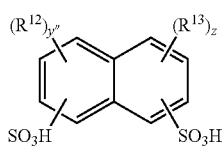

Formula (VIII)

wherein each of $R^{13}$ and $R^{12}$ independently are the same or different and are linear or branched alkyl group having from 6 to 40 carbons, y" is 0 to 3, z is 0 to 3, subscripts y"+z is 1 to 4.

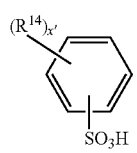

Formula (IX)

wherein $R^{14}$ is H or an alkyl group having up to 40 carbon atoms, and x' is an integer from 0 to 2.

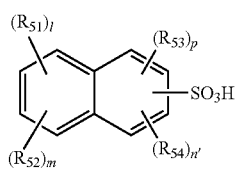

Formula (X)

wherein $R_{51}$, $R_{52}$, $R_{53}$ and $R_{54}$ are independently selected from the group consisting of hydrogen or essentially linear or branched hydrocarbyl groups having about 6 to about 40 carbon atoms; with the provisos that when subscripts l, m, n' and p are integers from 0 to 4 and the sum of l+m+n'+p is at least 1 and $R_{51}$, $R_{52}$, $R_{53}$ and $R_{54}$ are independently hydrogen when either l, m, n', or p is 0.

Nonlimiting examples of suitable sulfonic acids include methanesulfonic acid, para-toluenesulfonic acid, ortho-carboisopropoxybenzene sulfonic acid, ortho-carbomethoxybenzene sulfonic acid, benzenesulfonic acid, various alkylated benzenesulfonic acids, various substituted alkylated naphthalene sulfonic acids, and dinonylnaphthalene mono and di sulfonic acids.

The inventive catalysts are useful in the crosslinking or curing of, e.g., hydroxyl, carboxyl or amide containing polymers for producing polymeric film coatings that have superior hardness, impact resistance, adhesion, improved blister resistance, salt spray characteristics and flexibility. In some embodiments a mixture of a metal precursor and select sulfonic acids may be added to the coating composition to form an effective catalysts in situ.

One particular embodiment of the invention is a coil coating composition comprising one or more metal sulfonates of formula (I) through (V). These catalysts are especially effective in providing lower temperature cure in coil formulations, especially where traditional blocked acid catalysts are ineffective. For example, the catalysts of the invention provide cure at lower peak metal temperatures (PMT), as low as 170° C., with shorter dwell times, e.g., often about 25 sec., and are beneficial in preventing popping, a problem seen in coil applications with conventional epoxy, and amine blocked catalysts. The lower PMT relative to other catalysts results in savings on energy costs to the coater and increased line speeds resulting in larger volumes of coated product and higher productivity.

For example, commonly used blocked catalysts of the art are believed to function by deblocking at elevated temperatures to form the free acid, which likely functions as the active catalyst. Not wanting to be bound by theory, it appears that this may a reason why the curing temperatures when using these catalysts are so high. As indicated above, lower cure temperatures, and shorter cure times are needed in some applications and desired in most applications.

As mentioned above, the metal sulfonates of the present invention are effective at lower temperatures, e.g., 170° C. and can fully cure a coating composition, such as a coil coating composition, with a dwell time of, e.g., 25 seconds. Organic sulfonate esters do not provide any cure at such temperatures. Again, not wanting to be bound by theory, it is suggested that the present metal sulfonates do not deblock or form the free acid, but appear to instead function as is in catalyzing the curing reactions instead of as protic acids.

Another embodiment of the invention is a coating useful in multi-layer coatings. In one particular embodiment a curable coating composition for use in low bake repair of color-plus clear composite coatings is provided. For example, one embodiment provides the advantages of melamine functional resin containing coatings and cures at a temperature of 200° F. or less, especially 190° F. or less. Desirable performance properties in a low bake repair curable coating composition of the invention are good solvent resistance, hardness and environmental etch resistance. The low bake repair curable coating composition should also cure at curing conditions which make repair commercially feasible and advantageous, i.e., 5 to 15 seconds at 200° F. or less. Coatings of the invention can be used in a primer, basecoat and/or clearcoat layer applied using the wet on wet on wet process. Advantageous appearance properties include a top coat with a colorless appearance, high DOI, and a glossy appearance over a wide range of basecoat and clearcoat film thickness.

In addition to the coating compositions of the invention, other embodiments of the invention relate to the process of preparing, applying and curing the coatings. One embodiment, for example, provides a method for reducing cure temperature and time of a coil coating and another provide an improved method for the low bake repair of composite color-plus-clear coatings.

The catalysts of the present invention, being amine free, do not suffer from the amine induced discoloration typically seen in automotive coatings and coil coatings with amine blocked acid catalysts. The metal blocked catalysts impart exceptional thermal and storage stability to coating formulations containing the catalysts of the present invention, as compared to other covalent blocked catalysts like the epoxy blocked variants.

Additional embodiments of the invention includes the use of the inventive catalysts in exterior can coatings, metal extrusion coatings, general industrial coatings, and appliance coatings, and plastics coatings where activity profile of the catalysts of the present invention provides similar benefits, including, but not limited to, stable one package coating systems.

Particularly noteworthy is the use of these catalysts in coil coatings where their good solubility in typical polyester formulations, reduction in popping, good appearance/flow, pot life, non-yellowing characteristics, and unique lower temperature activity profile are useful as compared to amine and epoxy blocked versions of the same.

DETAILED DESCRIPTION OF THE INVENTION

Other than in the working examples or where otherwise indicated, all numbers expressing amounts of materials, reaction conditions, time durations, quantified properties of materials, and so forth, stated in the specification and claims are to be understood as being modified in all instances by the term "about." It will also be understood that any numerical range recited herein is intended to include all sub-ranges within that range and any combination of the various endpoints of such ranges or sub ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Embodiments of the invention provide a method for coating a metallic or plastic substrate, a method for minimizing the cure temperature and cure or dwell time used in a coating process, and coating compositions themselves. The method comprises the steps of applying to a substrate a coating composition with lower temperature curing consisting essentially of a polymeric film forming component, a crosslinking component to crosslink the polymeric component, and a catalyst selected from the group consisting of one or more select metal sulfonates. It is believed that the specific catalysts utilized in the present invention lower the cure temperature and cure time of the coating. The coating is applied to a substrate, either directly or to a coated or uncoated substrate. When the uncoated substrate is metal, it is referred to as "direct to metal", or the coating may be applied to a substrate that has been coated with a first coating such as a primer or other coating.

In many embodiments the functional film forming polymer component useful in the coatings of the present invention consists essentially of polymers selected from the group consisting of polyester, polyurethane, acrylic, alkyd, epoxy, polyamide, and polysilane polymers and mixtures thereof. Generally, the coating is a polyester, acrylic or polyurethane polymer or any combination thereof. The functional polymer is present in the coating composition in an amount of from 10% to about 90% by weight, based on total coating composition weight, for example from 20% to 80% or 20% to 70% by weight and often from 25% to 65% by weight, based on total coating composition weight.

In typical embodiments the coatings of the invention cure to form permanent, non-porous coating films. By permanent it is meant that the coatings are formulated and applied to produce a coating layer that will not dissolve or be readily removed under the conditions the coated article is intended to be used. Of course, all coatings will wear, chip erode etc., if exposed to the elements long enough, but the coatings of the invention are designed to hold up at least as well, and typically better, than other similar coatings. By being nonporous, the coatings prevent or significantly retard the penetration of elements that may leach components of the coating into the immediate environment.

Using the catalysts of the present invention enables cure times and temperatures of a wide variety of coatings to be reduced to levels below that when utilizing catalysts other than those defined in the present invention. In processes such as spraying, electrodeposition, extruding, plate coating, dipping, powder coating, cloud chamber, plasma coating and electrostatic deposition, the typical cure time ranges from 10 to 40 minutes, at temperatures between 250° F. and 450° F., contrasting with the present invention, where the cure time is reduced to about 5 to 25 minutes, generally at reduced temperatures of from 180° F. to 350° F.

In coil coating, the cure time currently ranges from about 10 to about 60 seconds at temperatures from about 425° F. (218° C.) to 525° F. (274° C.), in contrast to the present invention, where the cure time ranges from about 5 to about 60 seconds, generally from about 7 to about 40 seconds, and often from about 7 to about 35 seconds, at a curing temperature of from about 309° F. (154° C.) to about 410° F. (210° C.), e.g., 170° C.

The coating compositions of the present invention comprise an active hydrogen-containing resin, a curing agent present externally and/or internally as a part of the active hydrogen-containing resin, and one or more inventive metal sulfonate catalyst. The amount of catalyst added to the coating compositions of the present invention is, generally, a catalytic amount, that is that amount required to accelerate the reaction to a commercially acceptable rate. Generally, 0.1 to 5 percent by weight on resin solids, for example, 0.5 to 2 percent, is added.

When employing an external curing agent, the weight ratio of active hydrogen-containing resin to curing agent is typically from 95:5 to 50:50.

The coating compositions of the invention may also contain other common components including, e.g., from 0 to 50%, e.g., from 1 to 50%, by weight, based on the weight of the total solids of the coating, of a pigment. In some embodiments the amount of pigment is lower, e.g., 0 to 20%, 1 to 20%, 2 to 10%, 5 to 15% etc.; in other embodiments higher pigment loadings are used, e.g., from 10 to 50%, 20 to 50%, 25 to 45%, 20 to 49% etc. Pigments include color pigments, interference pigments, fillers and extender pigments, anti-corrosive pigments and the like and more than one pigment material may be used. Often, titanium oxide is present, with or without other pigments. Compositions containing pigments will often include dispersants, e.g., dispersants are often added at from 1 to 10%, often from 2 to 7% by weight based on the weight of pigment present.

The metal sulfonate of the invention is a compound of Formula (I) through (V), wherein M is selected from, e.g., Li, Na, K, Be, Mg, Ca, Ba, Fe, Sc, Ti, Al, Zn, Zr, Cd, Hg, Sn, Mo, and W; and x is A number from 1 to 6 including fractional components, for example, x is selected from 1, 2, 3, 4, 5, and 6. For example, in some embodiments M is selected from Li, Na, K, Mg, Ca, Ba, Fe, Ti, Al, Zn, Zr, Hg, Sn, Mo, and W; e.g., Li, Na, K, Mg, Ca, Ba, Fe, Ti, Al, Zn, Zr, Mo, and W.

When the catalyst is a compound of Formula (I), Z is a linear, branched, saturated or unsaturated alkyl having from 1 to 40 carbon atoms, cycloalkyl having from 5 to 40 carbon atoms, which alkyl and cycloalkyl may optionally substituted, e.g., by halogen, aryl having from 6 to 40 carbon atoms, aralkyl having from 7 to 9 carbon atoms, wherein the aralkyl optionally may be substituted with an alkyl having from 1 to 36 carbon atoms, and herein the alkyl, cycloalkyl, aryl or aralkyl is connected to the sulfur atom by a carbon atom.

For example, Z is a linear, branched, saturated or unsaturated alkyl from 1 to 24 carbon atoms, e.g., 1 to 12 carbon atoms, such as methyl, ethyl, propyl, butyl, pentyl, hexyl, octyl, nonyl, decyl, undececyl, dodecyl etc, isomers thereof, e.g., isopropyl, iso butyl, t-butyl, 2-ethyl hexyl, t-octyl, isononyl and the like, and any of the preceding alkyl groups containing one or more carbon carbon double bonds. The alkyl groups may also be substituted; in one embodiment the alkyl groups are substituted by halogen, such as F, Cl etc., for example a perfluoryl alkyl group such as trifluoromethyl; Or Z is cycloalkyl having from 5 to 40 carbon atoms, e.g., from 5 to 12 carbon atoms, optionally substituted as above, including monocyclic and polycyclic rings, including for example, cyclopentyl, cyclohexyl, norbornane, fused bicycle-octane, fused or spiro bicyclononanes, bicyclodecanes, bicycloundecanes, and the like;
Or Z is aryl having from 6 to 40 carbon atoms, e.g., from 6 to 12 carbon atoms, such as phenyl, biphenyl, naphthyl, anthryl, phenanthryl etc.,
or aralkyl having from 7 to 9 carbon atoms, optionally substituted by alkyl having from 1 to 36 carbon atoms, e.g., from 1 to 24 or 1 to 12 carbon atoms as described above.

When the catalyst is a compound of Formula (II) each of $R^{11}$ and $R^{12}$ are independently selected from linear or branched alkyl groups having up to 40 carbon atoms, for example, from 6 to 40 carbons, e.g., from 6 to 24 carbon atoms or 1 to 12 carbon atoms, such as methyl, ethyl, propyl, butyl, pentyl, hexyl, octyl, nonyl, decyl, undececyl, dodecyl etc, isomers thereof, e.g., isopropyl, iso butyl, t-butyl, 2-ethyl hexyl, t-octyl, isononyl and the like, and any of the preceding alkyl groups containing one or more carbon carbon double bonds. The alkyl groups may also be substituted, in one embodiment the alkyl groups are substituted by halogen, such as F, Cl etc., for example a perfluoryl alkyl group such as trifluoromethyl, y is 0 to 3, z is 0 to 3 with the proviso that y+z is 1 to 4.

When the catalyst is a compound of (III), $R^{10}$ is an alkyl group having up to 40 carbon atoms e.g., from 1 to 24 carbon atoms, which may optionally be substituted, e.g., by halogen, and often $R^{10}$ is an alkyl group selected from alkyl groups as described above for Z; and x' is 1 or 2;

When the catalyst is a compound of Formula (IV), $R_{51}$, $R_{52}$, $R_{53}$ and $R_{54}$ are independently selected from the group consisting of essentially linear or branched hydrocarbyl groups having up to 40 carbon atoms, e.g., about 6 to about 40 carbon atoms e.g., from 6 to 24 carbon atoms; and are typically selected from the groups as described above for $R^{11}$ and $R^{12}$ of formula (II) above; l, m, n and p are integers from 0 to 4 and the sum of l+m+n+p is at least 1;

When the catalyst is a compound of Formula (V), Y is selected from the group consisting of alkyl having from 1 to 20 carbon atoms, e.g., 1 to 12 carbon atoms, cycloalkyl having from 3 to 20 carbon atoms, e.g., 5 to 12 carbon atoms, aryl having from 6 to 18 carbon atoms, halogen, alkoxy having from 1 to 12 carbon atoms, hydroxyl, and aryloxy of 6 to 18 carbon atoms; y' is an integer from 0 to 4, w is an integer from 0 to 2, and z is an integer from 1 to 3, with the proviso that when w is 0, y is an integer from 1 to 4 and z is an integer from 2 to 3 and when y is 0, w is an integer from 1 to 2 and z is an integer from 1 to 3, and R is independently selected from the group consisting of hydrogen, alkyl having from 1 to 20 carbon atoms, cycloalkyl having from 3 to 20 carbon atoms, aryl having from 6 to 18 carbon atoms.

Examples of specific catalysts of the above formula include, for example: Zn(trifluoromethanesulfonate)$_2$, Zn(methanesulfonate)$_2$, Zn(p-toluenesulfonate)$_2$, Zn(dodecylbenzenesulfonate)$_2$, Zn(dinonylnaphthalenesulfonate)$_2$, Zn(didodecylbenzenesulfonate)$_2$, Zn(dinonylnaphthalenedisulfonate)$_1$, Al(trifluoromethanesulfonate)$_3$, Al(methanesulfonate)$_3$, Al(p-toluenesulfonate)$_3$, Al(dodecylbenzenesulfonate)$_3$, Al(dinonylnaphthalenesulfonate)$_3$, Al(didodecylbenzenesulfonate)$_3$, Al(dinonylnaphthalenedisulfonate)$_{1.5}$, Ti(trifluoromethanesulfonate)$_4$, Ti(methanesulfonate)$_4$, Ti(p-toluenesulfonate)$_4$, Ti(dodecylbenzenesulfonate)$_4$, Ti(dinonylnaphthalenesulfonate)$_4$, Ti(didodecylbenzenesulfonate)$_4$, Ti(dinonylnaphthalenedisulfonate)$_2$, Zr(trifluoromethanesulfonate)$_4$, Zr(methanesulfonate)$_4$, Zr(p-toluenesulfonate)$_4$, Zr(dodecylbenzenesulfonate)$_4$, Zr(dinonylnaphthalenesulfonate)$_4$, Zr(didodecylbenzenesulfonate)$_4$, Zr(dinonylnaphthalenedisulfonate)$_2$, Li(trifluoromethanesulfonate)$_1$, Li(methanesulfonate)$_1$, Li(p-toluenesulfonate)$_1$, Li(dodecylbenzenesulfonate)$_1$, Li(dinonylnaphthalenesulfonate)$_1$, Li(didodecylbenzenesulfonate)$_1$, Li(dinonylnaphthalenedisulfonate)$_{0.5}$, Ca(trifluoromethanesulfonate)$_2$, Ca(methanesulfonate)$_2$, Ca(p-toluenesulfonate)$_2$, Ca(dodecylbenzenesulfonate)$_2$, Ca(dinonylnaphthalenesulfonate)$_2$, Ca(didodecylbenzenesulfonate)$_2$, Ca(dinonylnaphthalenedisulfonate)$_1$, Mg(trifluoromethanesulfonate)$_2$, Mg(methanesulfonate)$_2$, Mg(p-toluenesulfonate)$_2$, Mg(dodecylbenzenesulfonate)$_2$, Mg(dinonylnaphthalenesulfonate)$_2$, Mg(didodecylbenzenesulfonate)$_2$, Mg(dinonylnaphthalenedisulfonate)$_1$, Ba(trifluoromethanesulfonate)$_2$, Ba(methanesulfonate)$_2$, Ba(p-toluenesulfonate)$_2$, Ba(dodecylbenzenesulfonate)$_2$, Ba(dinonylnaphthalenesulfonate)$_2$, Ba(didodecylbenzenesulfonate)$_2$, Ba(dinonylnaphthalenedisulfonate)$_1$, Fe(trifluoromethanesulfonate)$_3$, Fe(methanesulfonate)$_3$, Fe(p-toluenesulfonate)$_3$, Fe(dodecylbenzenesulfonate)$_3$, Fe(dinonylnaphthalenesulfonate)$_3$, Fe(didodecylbenzenesulfonate)$_3$, Fe(dinonylnaphthalenedisulfonate)$_{1.5}$, Mo(trifluoromethanesulfonate)$_5$, Mo(methanesulfonate)$_5$, Mo(p-toluenesulfonate)$_5$, Mo(dodecylbenzenesulfonate)$_5$, Mo(dinonylnaphthalenesulfonate)$_5$, Mo(didodecylbenzenesulfonate)$_5$, Mo(dinonylnaphthalenedisulfonate)$_{2.5}$, W(trifluoromethanesulfonate)$_6$, W(methanesulfonate)$_6$, W(p-toluenesulfonate)$_6$, W(dodecylbenzenesulfonate)$_6$, W(dinonylnaphthalenesulfonate)$_6$, W(didodecylbenzenesulfonate)$_6$, W(dinonylnaphthalenedisulfonate)$_3$.

In certain embodiments a mixture of two or more metal sulfonate catalysts are used in the same coating compositions. The two or more catalysts may have the same metal and different ligands, different metals with the same ligands, or different metals and different ligands. In one embodiment a mixture of two or more of the above named catalysts may be used, for example, two or more compounds selected from zinc, aluminum, titanium, zirconium, molybdenum, and/or tungsten dodecylbenzene sulfonate, didodecyl naphthalene sulfonate, dinonyl naphthalene sulfonate, toluene sulfonate and/or methane sulfonate. For example, a mixture comprising one or more of the aluminum salts above, i.e., Al(trifluoromethanesulfonate)$_3$, Al(methanesulfonate)$_3$, Al(p-toluenesulfonate)$_3$, Al(dodecylbenzenesulfonate)$_3$, Al(dinonylnaphthalenesulfonate)$_3$, Al(didodecylbenzenesulfonate)$_3$, Al(dinonylnaphthalenedisulfonate)$_{1.5}$, and one or more of the zinc salts above, i.e., Zn(trifluoromethanesulfonate)$_2$, Zn(methanesulfonate)$_2$, Zn(p-toluenesulfonate)$_2$, Zn(dodecylbenzenesulfonate)$_2$, Zn(dinonylnaphthalenesulfonate)$_2$, Zn(didodecylbenzenesulfonate)$_2$, Zn(dinonylnaphthalenedisulfonate)$_1$, in a weight ratio of 1:25 to 25:1, 1:20 to 20:1, 1:10 to 10:1, or 5:1 to 1:5.

The metal sulfonate catalysts of the invention can be produced by one of many methods known in the art for example from the reaction of a metal oxide and sulfonic acid, as described in U.S. Pat. No. 2,764,548. Nonlimiting examples of suitable metal oxides employed in preparing the claimed acid catalysts include those derived from metals such as Li, Na, K, Be, Mg, Ca, Ba, Fe, Sc, Ti, Al, Zn, Zr, Cd, Hg, Sn, Mo, and W. Nonlimiting examples of suitable sulfonic acids include methanesulfonic acid, para-toluenesulfonic acid, ortho-carboisopropoxybenzene sulfonic acid, ortho-carbomethoxybenzene sulfonic acid, benzenesulfonic acid, various alkylated benzenesulfonic acids, various substituted alkylated naphthalene sulfonic acids, dinonylnaphthalene mono and di-sulfonic acids, and didodecyl naphthalene mono and disulfonic acids.

One aspect of the claimed invention is that these metal catalysts are more stable compounds than the conventional covalent epoxy blocked latent acid catalysts containing a beta-hydroxyl group in the blocking ester side chain. Catalysts containing the beta hydroxyl functional group are more prone to intermolecular alkylation reaction leading to the liberation of free sulfonic acid as a function of time. The slow release of free sulfonic acid can lead to detrimental interaction with basic components present in the formulation, and can decrease the shelf life of resulting coating compositions. As a result of this increased stability, not only do the catalysts of the subject invention facilitate single package coating compositions but they also result in coating compositions having extended shelf life.

In many embodiments, the active hydrogen-containing resin is a polymeric polyol having a hydroxyl functionality of at least two, which is used with an external curing agent. Nonlimiting examples of polymeric polyols useful in the practice of the present invention include hydrocarbon polyols, ester polyols, ether polyols, polyester polyols, polyether polyols, amide polyols, polyamide polyols, urethane polyols, polyurethane polyols, acrylic polyols, urea polyols, polyurea polyols, cyclic nitrogen-containing polyols and mixtures thereof; generally the low molecular weight acrylic and polyester polyols and also polyurethane polyols. The aforesaid classes of polyols are described in detail in the following paragraphs.

Hydrocarbon polyols include, but are not limited to, trimethylolpropane; trimethylolethane; glycerol; 1,2,4-butane triol; 1,2,6-hexane triol; erythritol; sorbitol; mannitol; and diglycerol.

Ester polyols useful in the practice of the present invention are obtained by reacting a polyol with one mole or less of a monocarboxylic acid. The polyols have a hydroxyl functionality of at least 3.0, examples of which are described immediately above. Nonlimiting examples of suitable monocarboxylic acids include benzoic acid, hexanoic acid, octanoic acid, decanoic acid. Lauric acid, myristic acid, stearic acid, oleic acid, linoleic acid and linolenic acid can be used, but are less desirable.

Ether polyols useful in the practice of the present invention are made by reacting a suitable polyol as described above with a monoepoxide, e.g., ethylene oxide, propylene oxide, butyl glycidyl ether, octyl glycidyl ether, allyl glycidyl ether, phenyl glycidyl ether, 1,2-butylene oxide, styrene oxide, glycidyl acrylate, and glycidyl methacrylate.

Polyester polyols useful in the practice of the present invention are generally formed by the esterification of polyols with polycarboxylic acids or acid anhydrides. The polyols conventionally employed in making the polyester polyols include alkylene glycols, such as, but not limited to, ethylene glycol, propylene glycol, butylene glycol and neopentyl glycol, and other glycols such as hydrogenated bisphenol A, cyclohexanedimethanol, caprolactone-diol reaction products, hydroxyalkylated bisphenols, polyether glycols, e.g., poly(oxytetramethylene)glycol, and similar type compounds. Other diols of various types and polyols of higher functionality can also be used. Such higher polyols include, but are not limited to, trimethylolpropane, trimethylolethane, pentaerythritol and higher molecular weight polyols, such as obtained by the reaction product of ethylene oxide and trimethylolpropane and various hydrolyzed epoxide resins.

Suitable carboxylic acids used in to prepare polyester polyols with the above described polyols include, but are not limited to, phthalic, isophthalic, terephthalic, tetrahydrophthalic, hexahydrophthalic, adipic, azelaic, sebacic, maleic, glutaric chlorendic, tetrachlorophthalic, fumaric, itaconic, malonic, suberic, 2-methylsuccinic, 3,3-diethylglutaric, 2,2-dimethylsuccinic acid and trimellitic acid Anhydrides of these acids where they exist can also be employed and are encompassed by the term "carboxylic acid." Monocarboxylic acids such as benzoic acid and hexanoic acid can also be used, provided the average functionality of the polyol is above about 2.0. Saturated acids (including those aromatic acids where the only unsaturation is in the aromatic ring) are typically employed.

It is also possible to produce polyester polyols containing one or two alkylene oxide groups per hydroxy group and generally no more than three alkylene oxide groups per ester group for use in the practice of the present invention. The alkylene oxide-derived polyester polyol can be produced by substituting an alkylene oxide-derived polyol for all or part of the polyol component used to produce the polyester polyol. Useful alkylene oxide-derived polyols include diethylene glycol, triethylene glycol, dipropylene glycol, tetraethylene glycol, 2,2-bis(hydroxyethoxyphenyl) propane and 2,2-bis(beta-hydroxypropoxyphenyl) propane. These polyester polyols can also be produced by oxalkylating any one of the above-described polyester polyols.

Polyester polyols useful in the practice of the present invention can also be made from the reaction of a lactone with a polyol. The lactones, many of which are commercially available, are represented by the structure:

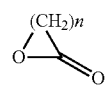

wherein n is from 2 to 9 and the R's are hydrogen, alkyl, cycloalkyl, alkoxy and single ring aromatic hydrocarbon radicals. For example, lactones are the epsilon-caprolactones where n equals 5. Polyols, such as the above-described diols and triols are used in the reaction with the lactone. Nonlimiting examples of suitable polyether polyols are polyalkylene ether polyols which include those having the following structural formula:

where the substituent R is hydrogen or lower alkyl containing from 1 to 5 carbon atoms including mixed substituents, n is from 2 to 6 and m is from 2 to 20. Included are poly(oxytetramethylene)glycols, poly(oxyethylene)glycols, poly(oxy-1,2-propylene)glycols and the reaction products of ethylene glycol with a mixture of 1,2-propylene oxide and ethylene oxide.

Also useful are polyether polyols formed from oxyalkylation of various polyols, for example, glycols such as, but not limited to, ethylene glycol, 1,6-hexanediol, and bisphenol A, or other higher polyols, such as trimethylolpropane and pentaerythritol. Polyols of higher functionality which can be utilized as indicated can be made, for instance, by oxyalkylation of compounds such as sorbitol or sucrose. One commonly utilized oxyalkylation method is the reaction of a polyol with an alkylene oxide, for example, ethylene or propylene oxide, in the presence of an acidic or basic catalyst.

Polyamide polyol resins useful in the instant invention can comprise those produced using conventional techniques. In general, the resins are produced from any of the above-described polyacids or lactones and diols, triols and higher alcohols and small amounts of diamines or amino alcohols. Suitable diamines and amino alcohols include, but are not limited to, hexamethylenediamine, ethylene-diamine, monoethanolamine, phenylenediamine, toluenediamine and diethanolamine. Amide polyols are also useful herein and are readily prepared by known methods.

Besides the above-mentioned polymeric polyols, polyurethane polyols can also be used. These polyols can be prepared by reacting any of the above-mentioned polyols with a minor amount of polyisocyanate (OH/NCO equivalent ratio greater than 1:1, typically greater than about 2:1) so that free hydroxyl groups are present in the product. Mixtures of both high molecular weight and low molecular weight polyols may be used. Among the low molecular weight polyols useful in this aspect of the present invention are diols and triols such as aliphatic polyols including alkylene polyols containing from 2 to 18 carbon atoms. Nonlimiting examples include ethylene glycol, 1,4-butanediol, 1,6-hexanediol and cycloaliphatic polyols, such as 1,2-hexanediol and cyclohexanedimethanol. Examples of triols include, but are not limited to, trimethylolpropane and trimethylolethane. Useful high molecular weight polyols are those described above. Also useful are polyols containing ether linkages such as diethylene glycol and triethylene glycol. Also, acid-containing polyols such as, but not limited to, dimethylolpropionic acid and amino alkyl alcohols such as ethanol amine and diethanol amine can be used. In addition to the polyurethane polyols, urethane polyols can also be used and are readily prepared by known methods.

The organic isocyanate which is used to prepare the polyurethane polyols useful in the practice of certain embodiments of the present invention can be an aliphatic or an aromatic isocyanate or a mixture of the two. The aliphatic isocyanates are typically used when exterior durability is a requisite. Often diisocyanates are employed although higher polyisocyanates and monoisocyanates can be used in place of or in combination with diisocyanates. Examples of suitable higher polyisocyanates are 1,2,4-benzene triisocyanate and polymethylene polyphenyl isocyanate. Examples of suitable monoisocyanates are butyl isocyanate, cyclohexyl isocyanate, phenyl isocyanate and tolyl isocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, alpha,alpha'-xylylene diisocyanate and 4,4'-methylene-bis(cyclohexyl isocyanate).

The polyurea polyol resins useful in the practice of the present invention are generally produced by reacting any of the above-described polyisocyanates with either an amino alcohol, such as monoethanol amine, or an amino alcohol and a diol. Urea polyols are also useful herein and are readily prepared by known methods.

Suitable cyclic nitrogen-containing polyols include, but are not limited to, such compounds as tris(hydroxyethyl) isocyanurate (THEIC), N,N'-bis(hydroxyethyl)-dimethyl hydantoin (BHDH), 1,4-bis[4,4-bis(hydroxymethyl)-1,3-oxazol-2-ene-2-yl]butane, hydroxyalkylated THEIC, hydroxyalkylated BHDH, bis(hydroxyethyl)ethylene urea, and 4,4-bis(hydroxymethyl)-1,3-oxazolidin-2-one.

Thermosetting acrylic polyols comprising the hydroxyalkyl esters of ethylenically-unsaturated carboxylic acids and at least one other ethylenically unsaturated monomer copolymerizable therewith, such as are described in U.S. Pat. Nos. 2,681,897 and 3,084,184 are often used in the present invention. Interpolymers of the class described are those containing hydroxyalkyl esters in which the alkyl group has up to about 18 carbon atoms. Valuable esters include acrylic acid and methacrylic acid esters of ethylene glycol and 1,2-propylene glycol, i.e., hydroxyethyl acrylate and methacrylate, and hydroxypropyl acrylate and methacrylate. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

Acrylic resins having either a carboxyl, hydroxyl or amide functional group such as obtained by copolymerization of the $C_1$ to $C_{18}$ alkyl ester of acrylic or methacrylic acid, styrene or substitutes styrene or acrylonitrile with functional monomers such as acrylic or methacrylic acid or the B-hydroxyalkylester of above acids. Typically the acrylic polymers have a molecular weight from about 2,000 to about 100,000. They are produced by conventional solution or bulk polymerization methods using free radical, or, if applicable, using ionic catalysts.

Copolymers of above acrylate monomers with the $C_1$ to $C_{18}$ ester or the hydroxyalkyl ester or half ester of maleic, fumaric or itaconic acid may also be used in the compositions of the present invention. Optionally, these resins can also contain other functional groups such as those derived from the acetoacetoxyethyl methacrylate or acrylamide monomer. In addition, the acrylic resin can contain other non acrylate monomers such as vinylether or vinylacetate or vinylchloride. Acrylic copolymers, copolymers of butylacrylate/styrene/hydroxyalkylacrylate/acrylic acid with a molecular weight of 2500 to 8000, a hydroxyl number of between about 50 to 150 and an acid number of between 0 to 40; butylmethacrylate/hydroxyalkylacrylate copolymers with a hydroxyl number of between 50 to 200 or a meq of hydroxyl groups of about 1.0 to about 3.5 meq per gram of polymer solids; copolymers of ethyl, butyl, 2-ethylhexyl acrylate or methacrylate with styrene and a functional monomer such as acrylamide, hydroxyethyl or hydroxypropyl acrylate or methacrylate or optionally a carboxyl functional monomer such as acrylic or methacrylic acid or maleic acid.

Typical commercially available acrylic resins include ACRYLOID (trademarked product of Rohm & Haas Company) JONCRYL (trademarked product of Johnson Wax Company).

Another class of thermosetting acrylic resins that may be employed in embodiments of the present invention comprises those that comprise the crosslinking carboxyl-containing polymers. The thermosetting carboxyl polymers that may be used herein consist generally of acrylic resins or modified acrylic resins containing from about 3 to about 40 percent by weight of ethylenically unsaturated acid. Acrylic materials which may be used include acrylates, such as ethyl acrylate, butyl acrylate, and hexyl acrylate; methacrylates, such as methyl methacrylate, isopropyl methacrylate, acrylonitrile, and hexyl methacrylate; maleate esters, such as dibutyl maleate; and fumarates, such as ethyl fumarate. Ethylenically unsaturated acids which may be used are those such as acrylic acid, methacrylic acid, fumaric acid, maleic acid, and itaconic acid.

Polyester or alkyd resins prepared by the esterification of diols, triols, tetraols or higher functional polyols with a mono-, di- or poly-basic acid may also be used in accordance with the present invention. Nonlimiting examples of such mono-, di- or poly-basic acids useful in these embodiments of the present invention are the naturally derived saturated and unsaturated $C_{12}$ to $C_{18}$ fatty acids, the dimers or higher oligomers of such fatty acids, the ortho, meta, or para phthalic acids, the aliphatic dicarboxylic acids such as succinic, glutaric, adipic, maleic, fumaric, sebasic, or dodecanoic acid, or higher functional acids such as trimellitic acid. The polyols typically are ethylene glycol, propylene glycol, 1,3-butylene glycol, 1,4-butylene glycol, 1,6-hexane diol, neopentyl glycol, diethylene glycol, dipropylene glycol, cyclohexane-dimethanol, glycerine, trimethylol ethane or propane pentaerythritol etc. The polyester or alkyd resins useful in the present invention typically, but not necessarily, have a molecular weight of 400 to about 15,000, and a hydroxyl or carboxyl functionality of between about 0.2 to about 6 meq/g of resin solids, e.g., between about 1 to 5 meq/g. Polyester resins derived from neopentylglycol, trimethylol, trimethylol propane, adipic and isophthalic acid with a molecular weight of between about 400 to 3000, a hydroxyl number of 340 to 10 or about 0.2 to 6 meq/g of resin solids, for example, 1 to 5. Alkyd resins prepared from a non drying oil such as coconut oil with a triol, such as glycerine and phthalic anhydrides, as a dibasic acid are often employed. The variety of polyester resins and alkyds commercially available is numerous and there is no restriction on their compositions as long as they have either hydroxyl or carboxyl functional groups.

Typical polyester resins are available commercially. These include CYPLEX polyester resins (Cytec Industries) AROPLAZ 6025 (trademarked product from Spencer Kellogg), K-FLEX 188 and 148 (King Industries), CARGIL polyester polyols (Cargill Corporation) and CHEMPOL polyester polyols, (Cook Composites and Polymers).

Alkyd resins useful in the present invention are produced by reacting the polycarboxylic acid and the polyhydric alcohol together with a drying, semi-drying or non-drying oil in proportions depending upon the properties desired. The oils are coupled into the resin molecule by esterification during the manufacturing and become an integral part of the polymer. The oil is fully saturated or predominantly unsaturated. When cast into films, the fully saturated oils tend to give a plasticizing effect to the film, whereas the predominantly unsaturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well know in the art.

Low to higher molecular weight epoxy resins derived from bisphenol A bisphenol F or epichlorohydrin are also contemplated for use in accordance with the present invention. Such resins have a molecular weight of about 800 to 10,000 for example, between about 1,000 to 5,000 and have, besides epoxy groups, hydroxyl functional groups. Examples of such resins include EPON from Hexion, DER from Dow Chemical Corporation, Araldite from Huntsman Corporation.

Vinyl polymers such as copolymers of vinylacetate with vinylchloride with a hydroxyl functional monomer. Commerically available vinyl resins may include VACH, VROH, VYES (Dow).

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyalkyl) esters, as well as various other alkylene glycol esters of such acids and mixed alkyl hydroxyalkyl esters, such as butyl hydroxyethyl maleate and benzyl hydroxypropyl maleate. The corresponding monoesters, such as the mono(hydroxyethyl), mono(hydroxypropyl), and similar alkylene glycol monoesters of maleic acid and similar acids, can also be used.

The monomer or monomers with which the hydroxyalkyl ester may be interpolymerized can be any ethylenic compound copolymerizable with the ester, the polymerization taking place through the ethylenically unsaturated linkages. These include, but are not limited to, monoolefinic and, in minor amounts, polyolefinic hydrocarbons, halogenated monoolefinic and diolefinic hydrocarbons, unsaturated esters of organic and inorganic acids, esters or amides of unsaturated acids, nitriles, unsaturated acids, and the like. Nonlimiting examples of such monomers include styrene; 1,3-butadiene; 2-chlorobutene; acrylonitrile; alpha-methylstyrene; alpha-chlorostyrene; 2-chlorobutadiene; 1,1-dichloroethylene; vinyl butyrate; vinyl acetate; vinyl chloride; allyl chloride; dimethyl maleate; divinyl benzene; diallyl itaconate; triallyl cyanurate; and the like. The most prevalent monomers are acrylates and methacrylates, such as ethyl acrylate, propyl acrylate, ethylhexyl acrylate, acrylamide, methyl methacrylate, butyl methacrylate, and the like, as well as methacrylic and acrylic acid and mixtures thereof.

Another important class of thermosetting acrylic resins that may be employed in embodiments of the present invention comprises those that comprise the crosslinking carboxyl-containing polymers. The thermosetting carboxyl polymers that may be used herein consist generally of acrylic resins or modified acrylic resins containing from about 3 to about 40 percent by weight of ethylenically unsaturated acid.

Acrylic materials which may be used include acrylates, such as ethyl acrylate, butyl acrylate, and hexyl acrylate; methacrylates, such as methyl methacrylate, isopropyl methacrylate, acrylonitrile, and hexyl methacrylate; maleate esters, such as dibutyl maleate; and fumarates, such as ethyl fumarate.

The ethylenically unsaturated acids which may be used are those such as acrylic acid, methacrylic acid, fumaric acid, maleic acid, and itaconic acid.

It should be understood by those skilled in the art that one may also employ as the active hydrogen-containing resin hydroxy functional vinyl resins or hydroxy functional alkyd resins which are well known to those skilled in the art. These resins can readily be prepared by art-recognized methods.

The phenolic resins useful in the present invention are commonly referred to as phenoplasts and are obtained by the condensation of phenol or alkyl substituted phenols with aldehydes. The monohydric phenols such as phenol, cresol and xylenol are the most typically utilized since they are readily available and relatively inexpensive. For example, phenol is most often monohydric phenol. Polyhydric phenols such as resorcinol can also be used herein. Often formaldehyde is the aldehyde used in the production of the phenolic resins. Other useful aldehydes include acetaldehyde, butyraldehyde and furfuraldehyde or mixtures thereof. For example, the phenolic resin is produced by the condensation of phenol and formaldehyde.

The polyepoxides useful for the present invention are those materials having a 1,2 epoxide group present in the molecule. Hydroxyl groups may also be present and often are. Polyepoxides contain more than one 1,2-epoxy group per molecule. In general, the epoxide equivalent weight can range from about 280 to about 4,000. These polyepoxides are saturated or unsaturated, cyclic or acyclic, aliphatic, alicyclic, aromatic or heterocyclic. They can contain substituents such as halogen, hydroxyl and ether groups. One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)-1,1-isobutane; 4,4-dihydroxybenzophenone; bis(4-hydroxyphenyl)-1,1-ethane; bis(2-hydroxynaphenyl)-methane; and 1,5-hydroxynaphthalene. One very common polyepoxide is a polyglycidyl ether of a polyphenol, such as bisphenol A.

Another class of epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Another class of epoxide resins are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful epoxides can be prepared from alcohols, e.g., butanol, trimethylol propane, by reaction with an epihalohydrin (e.g., epichlorohydrin), or by reaction of an allyl group with peroxide. The epoxide may be monofunctional or polyfunctional, which can be controlled by selection of the starting material. For example, a monoepoxide can be prepared by reacting a mono-alcohol or mono-acid with an epihalohydrin or a monounsaturate with peroxide, and a polyepoxide can be prepared by reacting a polyol (including diols, triols, and higher-functionality polyols) with an epihalohydrin or a polyunsaturate compound with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate (including isocyanurates, e.g., the isocyanurate of isophorone diisocyanate) or polymer or oligomer with glycidol. Other known polyepoxides, e.g., epoxy-novolacs, may also be used.

To form a curable composition, the polymeric resin(s) above are combined with a cross-linking agent. The cross-linking agent is one which is capable of reacting with the active hydrogens (normally, but not always provided by— OH hydrogens and sometimes—COOH hydrogens) in the polyester to give a thermoset composition upon curing. The ratio of the active hydrogen-containing resin to the cross-linking agent ranges from about 1:99 to about 99:1, generally from about 1:9 to about 9:1. Crosslinking agents typically used with the above-described polyols are often selected from aminoplast resins and phenoplast resins, typically aminoplast resins.

Aminoplast resins are based on the addition products of formaldehyde, with an amino- or amido-group carrying substance. Condensation products obtained from the reaction of alcohols and formaldehyde with melamine, urea or benzoguanamine are most common. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like.

While the aldehyde employed is most often formaldehyde, other similar condensation products can be made from other aldehydes, such as, but not limited to, acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol and butoxyethanol. Typical aminoplast resins are substantially alkylated with methanol or butanol. Often the selected aminoplasts are melamine-, urea- or benzoguanamine-formaldehyde condensates etherified with an alcohol containing 1 to 4 carbon atoms such as methanol, ethanol, butanol or mixtures thereof. Suitable commercially available products include RESIMENE products available from Ineos or CYMEL products available from Cytec.

Phenolic resins, i.e., phenoplasts, useful as curing agents are typically formed by the condensation of an aldehyde and a phenol. The most used aldehyde is formaldehyde, although other aldehydes, such as acetaldehyde, can also be employed. Methylene-releasing and aldehyde-releasing agents such as paraformaldehyde and hexamethylene tetramine, can be utilized as the aldehyde agent if desired. Various phenols can be used; for instance, the phenol employed can be phenol per se, a cresol, or a substituted phenol in which a hydrocarbon radical having a straight chain, a branched chain or a cyclic structure is substituted for hydrogen in the aromatic ring. Mixtures of phenols are also often employed. Some specific nonlimiting examples of phenols utilized to produce these resins include p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain. A common phenolic resin is phenol formaldehyde.

In a particular embodiment of the present invention a low molecular weight acrylic or polyester polyol is used as the active hydrogen-containing resin in conjunction with an at least partially methylated melamine-formaldehyde resin as aminoplast crosslinking agent.

In addition to the afore described active hydrogen-containing resins which cure by means of external crosslinking agent, some embodiments make use of an active hydrogen-containing resin capable of curing by means of internal crosslinking without the use of an external crosslinking agent; for example, polyol-containing acrylic resins which are interpolymers of carboxylic acid amides. These acrylic resins comprise interpolymers of an unsaturated carboxylic acid amide with at least one other monomer having a $CH_2=C<$group. These interpolymers are characterized in that they have amido hydrogen atoms replaced by the structure—$RCHOR_1$, wherein R is selected from the group consisting of hydrogen and saturated lower aliphatic hydrocarbon radicals and $R_1$ is a member of the class consisting of hydrogen and lower alkyl radicals with the proviso that the interpolymers have a hydroxyl number of at least 10. Generally, the interpolymers are produced in two ways.

In one method, the unsaturated carboxylic acid amide chosen is an N-alkoxymethyl acrylamide (i.e., a material having an —$NHRCHOR_1$ group in the molecule). This N-alkoxymethyl acrylamide is then polymerized with at least one other monomer having a $CH_2=C<$group to produce a useful interpolymer. In another method, an unsaturated carboxylic acid amide, e.g., acrylamide, is polymerized with at least one other monomer having a $CH_2=C<$group and is then reacted with an aldehyde to form a useful interpolymer. Nonlimiting examples of useful interpolymers and their methods of manufacture are disclosed in U.S. Pat. Nos. 2,978,437; 3,037,963 and 3,079,434.

Among the monomers which may be polymerized with the unsaturated carboxylic acid amides are acrylates such as, but not limited to, methyl acrylate, ethyl acrylate, isobutyl acrylate, and hexyl acrylate; styrene, vinyl toluene, maleate esters, such as dibutyl maleate; acidic materials such as acrylic acid, methacrylic acid, and maleic anhydride; vinyl ethers; vinyl ketones; vinyl pyridines; allyl acetoacetates; glycidyl acrylates; methacrylamide; dimethylbenzyl methacrylate; hydroxy-substituted acrylics, such as hydroxyethyl acrylate; and the adducts of epsilon-caprolactone and hydroxyalkyl acrylates. In general, monomers include ethyl acrylate, butyl acrylate, methyl acrylate, styrene, vinyl toluene, acrylonitrile, acrylic acid, monomethyl styrene and hydroxyethyl acrylate.

It has been found that certain desirable unsaturated carboxylic acid amide interpolymers are obtained when at least two monomeric compounds are interpolymerized with the N-alkoxymethylacrylamide-containing or the amide-containing material. In this manner, it is possible to tailor the interpolymer to have any desired degree of hardness or flexibility. For example, one useful ternary interpolymer is prepared from the acrylamide, hydroxyethyl acrylate and methyl methacrylate, this interpolymer then being reacted with an aldehyde to produce a material useful in this invention.

It is known that small amounts of methyl methacrylate tend to improve the hardness of multi-component interpolymers where one of the monomers is of the type which forms soft homopolymers. It has also been found that a small quantity of an acid monomer, such as acrylic acid, methacrylic acid, crotonic acid, maleic acid or fumaric acid, is particularly useful as an internal catalyst in that it imparts to the coating composition desirable fast curing properties. In place of acrylamide, any other polymerizable amide, for example methacrylamide or itaconic diamide, may be utilized.

The N-alkoxymethyl acrylamides useful in this invention are known in the art, and include such materials as N-alkoxymethyl acrylamides, N-alkoxymethyl methacrylamides, N-methyl-N-alkoxymethylacrylamides, and the like. Specific examples include N-butoxymethylacrylamide, N-isobutoxymethylacrylamide, N-(methoxyethoxymethyl) acrylamide, and hydroxymethylacrylamide.

Although it is not required, if desired, external crosslinking agent can be added to the aforesaid interpolymers.

According to another embodiments of the invention the active hydrogen-containing resin comprises a silicone containing resin. The silicon containing resins that can be used as active hydrogen-containing resin include, for example, polysiloxanes. Non-limiting examples of polysiloxanes include linear, branched or cyclic polydimethylsiloxane; polysiloxanes having a hydroxyl group in the molecular chain such as silanol-terminated polydimethylsiloxane, diphenylsilanol-terminated polydimethylphenylsiloxane, carbinol-terminated polydimethylsiloxane, hydroxypropyl-terminated polydimethylsiloxane and polydimethyl-hydroxyalkylene oxide methylsiloxane; polysiloxanes having an amino group in the molecular chain such as bis(aminopropyldimethyl)siloxane, aminopropyl-terminated polydimethylsiloxane, aminoalkyl group-containing polydimethylsiloxane, dimethylamino-terminated polydimethylsiloxane and bis(aminopropyldimethyl)siloxane; polysiloxanes having a glycidoxyalkyl group in the molecular chain such as glycidoxypropyl-terminated polydimethylsiloxane, glycidoxypropyl-containing polyglycidoxypropylmethylsiloxane and a polyglycidoxypropylmethyldimethylsiloxane copolymer and polysiloxanes having functional groups which easily physically or chemically bond to a hydroxyl group on, for example, a silica surface, such as alkoxy, hydroxyl and amino groups. As such, the above polysiloxanes may be used alone or in combination.

In addition to coil coatings, anther particular embodiment uses the metal sulfonates to prepare a low bake repair coating composition for use in repairing surface imperfections and/or defects in color-plus-clear composite coatings and a method of making such low bake repairs. In particular, the invention provides a way to effect low bake repairs of such composite coatings while still obtaining desirable performance and appearance properties in the repaired area.

For example, the present invention provides a lower temperature curable coating composition comprising a film forming component (A) which includes a first component (a) having a compound having appended thereto at least one carbamate or urea functional group, or a group convertible to a carbamate or urea group, and a second component (b) which is a compound reactive with said carbamate or urea groups on component (a), and a lower temperature cure catalyst (B) comprising compounds selected from the group consisting of metal sulfonates of the present invention.

The term "film forming component (A)" in the lower temperature curable coating composition refers to the binder or solid material which forms the polymeric film portion of the cured film.

First component (a) comprises a compound selected from the group consisting of oligomers and polymers having appended thereto more than one carbamate group or more than one urea group, or more than one group convertible to a carbamate or urea group.

Oligomers typically have a molecular weight of between 148 and 2000, in many embodiments the molecular weight for the oligomers is between 900 and 1092; polymers typically have a molecular weight of between 2,000 and 20,000, often between 4000 and 6000. Mixtures of said oligomers and polymers may be used as component (A). Molecular weight can be determined by the GPC method using a polystyrene standard. The carbamate or urea content of the polymer, on a molecular weight per equivalent of carbamate or urea functionality, will generally be between 200 and 1200, often between 300 and 800.

Carbamate groups can generally be characterized by the formula

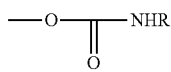

wherein R is H or alkyl, e.g., alkyl of 1 to 4 carbon atoms. Typically R is H or methyl, and for example, R is H.
Urea groups can generally be characterized by the formula

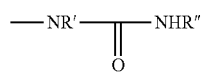

wherein R' and R" each independently represent H or alkyl, e.g., alkyl of 1 to 4 carbon atoms, or R' and R" may together form a heterocyclic ring structure (e.g. where R' and R" form an ethylene bridge).

Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is often under elevated pressure (e.g. 60-150 psi). The temperature for this reaction is typically 60-150° C. Useful catalysts include any that activate an oxirane ring, such as tertiary amine or quaternary salts (e.g. tetramethyl ammonium bromide), combinations of complex organotin halides and alkyl phosphonium halides (e.g., $((CH_3)_3SnI$, $BU_4SnI$, $Bu_4PI$, and $(CH_3)_4PI$), potassium salts (e.g., $K_2CO_3$, KI), often in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with $CO_2$ to form a cyclic carbonate, and then with ammonia or a primary amine to form the carbamate.

Oligomeric compounds useful as first component (a), and having more than one carbamate functional group, have the general formula

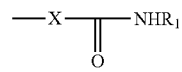

wherein X is O, S or NH, $R_1$ is H or alkyl of 1 to 4 carbon atoms. The compounds useful as oligomeric component (a) according to the invention can be prepared in a variety of ways. The carbamate can be primary, terminating in an $NH_2$ group, or secondary, terminating in an NHR group, typically the carbamate is primary.

One way to prepare oligomeric compounds useful as component (a) is to react an alcohol ('alcohol' is defined herein as having one or more OH groups) with more than one urea to form a compound with carbamate groups. This reaction is accomplished by heating a mixture of the alcohol and ureas. This reaction is also performed under heat, often in the presence of a catalyst as is known in the art. Another technique is the reaction of an alcohol with cyanic acid to form a compound with primary carbamate groups (i.e., unsubstituted carbamates). Carbamates may also be prepared by reaction of an alcohol with phosgene and then ammonia to form a compound having primary carbamate groups, or by reaction of an alcohol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Also, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, generally in the presence of a catalyst such as an organo-metallic catalyst (e.g., dibutyltin dilaurate). Other techniques for preparing carbamates are also known in the art and are described, for example, in P. Adams & F. Baron, "Esters of Carbamic Acid", Chemical Review, v. 65, 1965.

Various alcohols can be used in the preparation of carbamate compounds useful as first component (a) according to the invention. They generally have from 1 to 200 carbon atoms, typically 1-60 carbon atoms, and may be monofunctional or polyfunctional (e.g., a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol, 1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Polymeric compounds suitable for use in first component (a) are selected from the group consisting of polyester, epoxy, alkyd, urethane, acrylic, polyamide, and polysilane polymers and mixtures thereof, wherein the polymer has more than one carbamate functional group appended thereto.

In one embodiment, first component (a) comprises a carbamate functional acrylic polymer represented by the randomly repeating units according to the following formula:

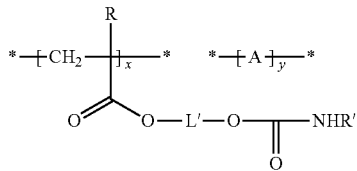

In the above formula, R represents H or CH$_3$. R' represents H, alkyl of, e.g., 1 to 6 carbon atoms, or cycloalkyl typically of up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to photo-induced hydrolysis, and should be avoided in locations that would place the ether linkage in the crosslink matrix. The values x and y represent weight percentages, with x being 10 to 90% and generally 20 to 50%, and y being 90 to 10% and generally 80 to 50%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), vinyl toluene, styrene, styrenic derivatives such as a-methyl styrene, t-butyl styrene, and the like.

L represents a divalent linking group, such as an aliphatic of 1 to 8 carbon atoms, cycloaliphatic, or aromatic linking group of 6 to 10 carbon atoms. Examples of L include

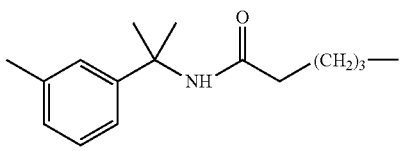

—(CH$_2$)—, —(CH$_2$)$_2$—, —(CH$_2$)$_4$—, and the like. In one embodiment, —L— is represented by —COO—L'— where L' is a divalent linking group. For example, polymeric first component (a) is represented by randomly repeating units according to the following formula:

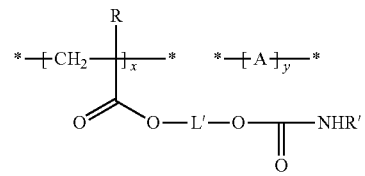

In this formula, R, R', A, x, and y are as defined above. L' may be a divalent aliphatic linking group often of 1 to 8 carbon atoms, e.g., —(CH$_2$)—, —(CH$_2$)$_2$—, —(CH$_2$)$_4$—, and the like, or a divalent cycloaliphatic linking group, generally up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. This carbamate functional acrylic polymer is described in U.S. Pat. No. 5,356,669 which is hereby incorporated by reference.

The first component (a) polymer used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328; 3,674,838; 4,126,747; 4,279,833; and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an a,b-unsaturated acid ester with a hydroxy carbamate ester to form the carbamyloxy carboxylate. Yet another technique involves formation of a hydroxyalkyl carbamate by reacting ammonia, or a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing an acrylic polymer for use as component (a) in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing such acrylic polymers involves thermally decomposing urea (to give off ammonia and HNCO) in the presence of a hydroxy-functional acrylic polymer or copolymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to trans-esterify an acrylate polymer with a hydroxyalkyl carbamate.

Groups capable of forming urea groups include amino groups that can be converted to urea groups by reaction with a monoisocyanate (e.g., methyl isocyanate) to form a secondary urea group or with cyanic acid (which may be formed in situ by thermal decomposition of urea) to form a primary urea group. This reaction typically occurs in the presence of a catalyst as is known in the art. An amino group can also be reacted with phosgene and then ammonia to form a compound having primary urea group(s), or by reaction of an amino group with phosgene and then a primary amine to form a compound having secondary urea groups. Another approach is to react an isocyanate with a hydroxy urea compound to form a urea-capped isocyanate derivative. For example, one isocyanate group on toluene diisocyanate can be reacted with hydroxyethyl ethylene urea, followed by reaction of the other isocyanate group with an excess of polyol to form a hydroxy carbamate.

Second component (b) comprises a compound having functional groups reactive with said carbamate or urea groups on component (a). Suitable reactive groups include active methylol or methylalkoxy groups on aminoplast crosslinking agents or on other compounds such as phenol/formaldehyde adducts, acrylamide groups, polyaldehyde, ann acetal or hemiacetal, isocyanate groups, siloxane groups, cyclic carbonate groups, and anhydride groups. Examples of (b) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polymers having acrylamide groups, polymers having methylol or alkoxymethyl groups, polyanhydrides (e.g., polysuccinic anhydride), and polysiloxanes (e.g., trimethoxy siloxane). Typically an aminoplast resin such as melamine formaldehyde resin or urea formaldehyde resin are used, e.g., aminoplast resins where one or more of the amino nitrogens is substituted with a carbamate group for use in a process with a curing temperature below 150° C., as described in U.S. patent application Ser. No. 07/965,510 entitled "Carbamate-Defunctionalized Aminoplast Curing for Polymer Compositions" in the names of John W. Rehfuss and Donald L. St. Aubin.

For example, the polyaldehyde of the second component of the present invention may have two aldehyde groups (also referred to herein as a dialdehyde), wherein at least one of the two aldehyde groups reacts with two carbamate groups from the same polyurethane chain (molecule) so as to form the crosslinked polyurethane comprising a plurality of geminal bis(urethane) groups. The two aldehyde groups of the dialdehyde may react with two carbamate groups from two different polyurethane chains so as to form the crosslinked polyurethane comprising a plurality of geminal bis(urethane) groups. Suitable polyaldehydes of the present invention have two, three, four or more aldehyde groups. A polyaldehyde having three aldehyde groups is also referred to herein as a trialdehyde.

The polyaldehyde of the second component can include any such molecule having from 2 to 20 carbon atoms or it can have more than 20 carbon atoms, i.e, up to 100, with the proviso that polyaldehydes having more than 20 carbon atoms will have at least one aldehyde group for every 11 carbon atoms, for example, at least one aldehyde group for every 10 carbon atoms. The polyaldehyde can be a cyclic, straight or branched; cyclic and nonaromatic; cyclic and aromatic (e.g., 3-formylbenzaldehyde), or a combination thereof.

The polyaldehyde of the present invention is substantially formaldehyde free. As used herein, the term "substantially formaldehyde free" means that the multicomponent composition or ambient temperature curable composition comprises less than 500 ppm of free formaldehyde, based on the total weight of polyaldehyde solids, e.g., less than 300 ppm, often less than 200 ppm. The compositions of the present invention contain so little of resins made from formaldehyde, such as aminoplasts and phenol or resole formaldehyde condensates, that the amount of free formaldehyde in such compositions meets the definition of "substantially formaldehyde free".

Typically, the polyaldehyde of the present invention comprises one or more cyclic, nonaromatic polyaldehydes or one or more aromatic polyaldehydes. For example, the polyaldehyde comprises one or more cyclic, nonaromatic polyaldehydes having from 3 to 20 ring carbon atoms, and may consist essentially of one or more cyclic, nonaromatic polyaldehydes having from 3 to 20 ring carbon atoms. Often each cyclic, nonaromatic polyaldehyde in the multicomponent composition independently has from 5 to 12 ring carbon atoms, and, even more preferably, is a mixture of (cis,trans)-1,4-cyclohexanedicarboxyaldehydes and (cis, trans)-1,3-cyclohexanedicarboxyaldehydes.

According to the present invention, the polyaldehyde may comprise one or more acyclic, straight or branched polyaldehyde having from 2 to 16 carbon atoms.

In another embodiment, each of the one or more acyclic, straight or branched polyaldehydes having 16 carbon atoms or more is prepared by hydroformylating a substantially water insoluble multi-olefin-containing compound that is derived from a fatty acid ester or, more preferably, a seed oil. For example, each of the one or more acyclic, straight or branched polyaldehydes having 16 carbon atoms or more is prepared by hydroformylating a multi-olefin-containing oligomer or polymer. Preferably, the multi-olefin-containing compound that is derived from the seed oil is a multi-olefin-containing fatty acid triglyceride having 48 carbon atoms or more.

Examples of suitable cyclic polyaldehydes are trans-1,3-cyclohexanedicarboxaldehyde; cis-1,3-cyclohexanedicarboxaldehyde; trans-1,4-cyclohexanedicarboxaldehyde; cis-1,4-cyclohexanedicarboxaldehyde; a mixture of 1,3-cyclohexanedicarboxaldehydes and 1,4-cyclohexanedicarboxaldehydes, preferably a 1-to-1 mixture thereof; exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; endo,endo-2,6-norbornanedicarboxaldehyde product (endo and exo mixture); 3-(3-formylcyclohexyl)propanal; 3-(4-formylcyclohexyl)propanal; 2-(3-formylcyclohexyl)propanal; 2-(4-formylcyclohexyl)propanal; and cyclododecane-1, 4,8-tricarbaldehyde. The trans-1,3- cyclohexanedicarboxaldehyde; cis-1,3-cyclohexanedicarboxaldehyde; trans-1,4-cyclohexanedicarboxaldehyde; and cis-1,4-cyclohexanedicarboxaldehyde can be prepared by a process comprising hydroformylating 3-cyclohexene-1-carboxaldehyde using the hydroformylating conditions described later.

The 1:1 mixture of 1,3- and 1,4-cyclohexanedicarboxaldehydes can be prepared by a process comprising reacting acrolein and 1,3-butadiene in a Diels-Alder reaction to give 3-cyclohexenecarboxaldehyde (also called 1,2,3,6-tetrahydrobenzaldehyde), and hydroformylating the 3-cyclohexenecarboxaldehyde using the hydroformylating conditions described later. The exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; and endo,endo-2,6-norbornanedicarboxaldehyde product (endo and exo mixture) can be prepared by a process comprising reacting acrolein and cyclopentadiene in a Diels-Alder reaction to give a 2-norbornene-5-carboxaldehyde, and hydroformylating the 2-norbornene-5-carboxaldehyde using the hydroformylating conditions described later. The 3-(3-formylcyclohexyl)propanal; 3-(4-formylcyclohexyl)propanal; 2-(3-formylcyclohexyl)propanal; and 2-(4-formylcyclohexyl)propanal can be prepared by a process comprising hydroformylating vinyl cyclohexene. The cyclododecane-1,4,8-tricarbaldehyde can be prepared by a process comprising trimerizing 1,3-butadiene to give 1,4,8-cyclododecatriene, and hydroformylating the 1,4,8-cyclododecatriene using the hydroformylating conditions described later.

The polyaldehyde of the present invention can be unblocked and unprotected or blocked or protected. Blocked or protected polyaldehydes can be formed by reacting an unblocked and unprotected polyaldehyde with a suitable blocking or protecting group. Examples of protecting or blocking groups for aldehyde groups are bisulfites (e.g., from reaction of the polyaldehyde with sodium bisulfite), dioxolanes (e.g., from reaction of the polyaldehyde with ethylene glycol), oximes (e.g., from reaction of the polyaldehyde with hydroxylamine), imines (e.g., from reaction of the polyaldehyde with methylamine), and oxazolidines (e.g., from reaction of the polyaldehyde with a 2-aminoethanol).

Aldehyde protecting groups are, and preferred protected polyaldehydes comprise, a hydrated group (>C(OH)$_2$), hemiacetal, acetal, or imine. These preferred protected polyaldehydes can be prepared by respectively reacting the polyaldehyde with water; one mole equivalent of an alkanol (e.g., methanol or ethanol); two mole equivalents of the alkanol; or ammonia or a primary amine (e.g., methylamine). The hemiacetal, acetal, or imine protecting group can, if desired, be removed by a deprotection such as hydrolysis to give back the unprotected form of the polyaldehyde. Such aldehyde protecting or blocking groups and formation and removal (i.e., deprotection) is taught, for example, in U.S. Pat. No. 6,177,514 B1.

Generally, the polyaldehyde is stable in neat form (i.e., does not materially self-polymerize) and, more preferably, is substantially water insoluble and is stable in neat form.

Additional ingredients may be added to the low bake repair coating composition, such as, but not limited to pigments, rheology control agents, flow control additives, ultraviolet absorbers, and hindered amine light stabilizers.

Solvents may also be present. In general, depending on the solubility characteristics of component (A), the solvent can be any organic solvent or solvents and/or water. In one embodiment, the solvent is a polar organic solvent including, polar aliphatic solvents and polar aromatic solvents, for example, a ketone, ester, acetate, alcohol, aprotic amide, aprotic sulfoxide, or aprotic amine. Examples of useful solvents include methyl ethyl ketone, methyl isobutyl ketone, n-amyl acetate, ethylene glycol butyl ether-acetate, propylene glycol monomethyl ether acetate, xylene, n-methylpyrrolidone (NMP), isobutanol (iBuOH), methanol (MeOH), propylene carbonate (PC), or blends of aromatic hydrocarbons. Alternatively, the solvent may be water or a mixture of water with small amounts of aqueous co-solvents. The solvent may be present in the composition of the invention in an amount of from about 0.01 weight percent to about 99 weight percent, generally from about 10 weight percent to about 60 weight percent, and typically from about 30 weight percent to about 50 weight percent.

The low bake repair composition of the invention may be a low bake repair pigmented coating composition or low bake repair clearcoat coating composition. Typically, the composition of the invention is utilized as a curable low bake clearcoat repair composition. In one particular embodiment, the composition of the invention is used as a clear and/or colorless low bake repair coating composition over a previously cured composite coating.

The invention further provides a method for repairing a composite coating. The method requires that a cured coated surface be provided. The cured coated surface will typically have a surface imperfection and/or defect that requires repair. The cured coated surface cab be any surface such as metal, plastic, wood and mixtures thereof, for example, plastic and metal automotive substrates, such as metal automotive body panels.

The cured coating being repaired may be any cured coating composition, including but not limited to, primers, sealers, bisects, clearcoats, topcoats and mixtures thereof. For example, cured coatings are automotive coatings, especially topcoats, bisects, clearcoats and mixtures thereof. Typically the cured coatings are composite coatings employing a pigmented basecoat and a clearcoat wherein the clearcoat is applied prior to the curing of the pigmented basecoat. Often the pigmented basecoat composition will be a water borne basecoat composition such as is described in U.S. Pat. No. Re. 34,730, hereby incorporated by reference. Polymers known in the art to be useful in basecoat compositions include acrylics, vinyls, polyurethanes, polycarbonates, polyesters, alkyds, and polysiloxanes, for example, an acrylic polymer.

The invention thus provides coating compositions comprising metal sulfonate latent catalysts having very desirable cure characteristics, which coatings can be used in almost any industrial or construction coating process. The coating compositions may be solvent borne, water borne or powder coatings. They can be used on metallic substrates, such as steel or aluminum, and they can be applied with or without a primer. They can also be applied to other substrates such as plastics and wood. The compositions can be applied in any conventional manner, such as, spray-, dip-, roll-, or brush-coating. Depending the substrate, the thickness of the coating layer, the resins employed etc., there will be broad variation in cure time and temperature of the inventive coatings. The use of the metal sulfonate catalysts of the invention in such a wide range of coating applications demonstrates the catalysts' versatility.

Any of the coating compositions of the present invention can contain, in addition to an active hydrogen-containing resin, curing agent, and catalyst, other components in amounts sufficient to enhance various properties of the composition or the final coating. Nonlimiting examples of such components include the addition of effective amounts of pigments, pigment stabilizers, rheology control agents, dispersants, adhesion-promoting agents, colorants, light stabilizers and the like.

Specific embodiments of the invention include coil coatings with lower cure temperatures and shorter oven dwell times. For example, coil coatings of the invention can be sufficiently cured at a peak metal temperature as low as about 170° C. although they are robust enough to be curable at temperatures as high as 280° C. without significant decrease in coating properties. The coating composition of the invention may be a topcoat applied to the coil stock following application of a primer layer, or a single coat without a separate primer layer, which may be done for example for aluminum. The coating composition could also be formulated as a primer composition, e.g. by using pigments typical of primers and additives e.g. for adhesion, or as a "backer" coating, a coating applied to the back or reverse side of a coil.

The claimed coating compositions are also useful for electrostatic spray application, for example for automotive body parts, which are typically baked at a temperature of from about 100° C. to about 350° C. to form a cured coating. Such coatings may also be employed as a primer layer, pigmented basecoat or clear top coat in almost an composite coating.

Another specific embodiment is a curable low bake repair coating composition comprising a metal sulfonate of the invention, which will typically cure at a temperature of about less than 200° F./93° C., for example, at a temperature of less than 190° F./88° C., for example at a temperature of from about 80° F./82° C. to about 190° F./88° C.

One embodiment is directed to a curable organic solvent based primer or coating composition comprising a total solids content of at least 50 percent capable of acid catalyzed crosslinking and containing at least one active hydrogen-containing resin, at least one curing agent present externally and/or internally as a part of the active hydrogen-containing resin, and a catalytic amount of at least one metal sulfonate of the present invention.

Another embodiment provides waterborne coatings, such as waterborne polyester coating compositions comprise partially neutralized acidic functional polyesters dispersed in water as very fine particles, which contain the metal sulfonates of the invention. Such compositions form coating compositions which have low VOCs, i.e., about 1.5 lbs/gal. or below and even as low as about 0.5 lb/gal. or below. Still other embodiments relate to the use of the metal sulfonates of the invention in powder coating compositions and coatings for wood, composite and other substrates used in industrial and construction applications.

The latent catalysts of the invention are stable upon oven aging at 50° C., with no increase in acid value and no loss in cure efficiency after four weeks exposure to elevated temperatures as opposed to conventional amine and epoxy blocked acids will dissociate to generate free acid upon oven aging. The claimed coating compositions not only facilitate "single-container" packaging, but they also provide improved storage stability. In addition they can also provide such qualities as improved gloss, good flexibility, durability and/or chemical resistance.

The following examples are submitted for the purpose of further illustrating the nature of the present invention and should not be construed as a limitation on the scope thereof. All parts and percentages in the Examples and throughout the specification are by weight unless otherwise indicated.

EXAMPLES

Cure Studies in a Clear PE/Melamine Coil System

Clear Coil Coating Preparation: Polymac 220-1935 (hydroxyl functional polyester resin; 65% solids) and Resimene 747 (melamine; 100% solids) were homogeneously mixed with ethyl-3-ethoxy propionate (EEP), xylene, and BYK-310 (leveling agent) to form a 55% resin solution tabulated in TABLE 1. The resin solutions were catalyzed with an amine blocked p-TSA and metal sulfonate catalysts (25% active) listed in TABLES 2-4 at a concentration of 0.5% of active catalyst based on total resin solids. Films were cast on pretreated steel panels at a dry film thickness of approximately 25 μm. and baked in a coil oven for 25 seconds at peak metal temperatures (PMT) of 210° C., 170° C., and 154° C., respectively. The degrees of cure for each catalyst system were determined by the pendulum hardness and MEK double rubs. In addition storage stability of the formulations at 60° C. was evaluated by measuring viscosity changes over time. Double rub procedure: MEK is applied to eight ply cheesecloth and rubbed across the specimen for 100+ rubs or less if paint fails earlier. This is described in Technical Bulletin 4 of the National Coil Coaters Association, Revised June 1996.

The results of this study are shown on Tables 2-5 and show that metal sulfonate catalysts of the current invention are effective lower temperature catalysts for polyester/melamine clear coil coatings. Even at distinctly lower baking temperatures (PMT) and dwell time, completely cross-linked coatings were obtained. In addition fully formulated coatings containing these catalysts exhibit excellent storage stability.

TABLE 1

| Ingredients | % by weight |
| --- | --- |
| Polymac 220-1935 | 72.00 |
| Resimene 747 | 8.26 |
| EEP | 10.00 |
| Xylene | 9.50 |
| BYK-310 | 0.24 |
| Catalysts | 0.11 |

TABLE 2

| Examples | Catalysts | Bake Schedule | Pendulum Hardness | MEK Double Rubs |
| --- | --- | --- | --- | --- |
| 1 | Amine Blocked p-toluene sulfonic acid | 210° C. × 25 sec | 52 | <100 |
| 2 | Zn(Dodecylbenzenesulfonate)$_2$ Zn(DDBSA)$_2$ | 210° C. × 25 sec | 92 | 100$^+$ |

TABLE 2-continued

| Examples | Catalysts | Bake Schedule | Pendulum Hardness | MEK Double Rubs |
|---|---|---|---|---|
| 3 | Zn(Dinonylnaphthalenesulfonate)$_2$ Zn(DNNSA)$_2$ | 210° C. × 25 sec | 89 | 100$^+$ |
| 4 | Zn(Dinonylnaphthalenedisulfonate)$_1$ Zn(DNNDSA)$_1$ | 210° C. × 25 sec | 92 | 100$^+$ |
| 5 | Zn(p-Toluenesulfonate)$_2$ Zn(p-TSA)$_2$ | 210° C. × 25 sec | 100 | 100$^+$ |
| 6 | Zn(Methanesulfonate)$_2$ Zn(MSA)$_2$ | 210° C. × 25 sec | 96 | 100$^+$ |
| 7 | Ca(Dinonylnaphthalenesulfonate)$_2$ Ca(DNNSA)$_2$ | 210° C. × 25 sec | 89 | 100$^+$ |
| 8 | Mg(Dinonylnaphthalenesulfonate)$_2$ Mg(DNNSA)$_2$ | 210° C. × 25 sec | 89 | 100$^+$ |
| 9 | Ba(Dinonylnaphthalenesulfonate)$_2$ Ba(DNNSA)$_2$ | 210° C. × 25 sec | 87 | 100$^+$ |
| 10 | Li(Dodecylbenzenesulfonate)$_1$ Li(DDBSA)$_1$ | 210° C. × 25 sec | 89 | 100$^+$ |
| 11 | Al(Dodecylbenzenesulfonate)$_3$ Al(DDBSA)$_3$ | 210° C. × 25 sec | 106 | 100$^+$ |
| 12 | Ti(Dodecylbenzenesulfonate)$_4$ Ti(DDBSA)$_4$ | 210° C. × 25 sec | 115 | 100$^+$ |
| 13 | Zr(Dodecylbenzenesulfonate)$_4$ Zr(DDBSA)$_4$ | 210° C. × 25 sec | 114 | 100$^+$ |

TABLE 3

| Examples | Catalysts | Bake Schedule | Pendulum Hardness | MEK Double Rubs |
|---|---|---|---|---|
| 1 | Amine Blocked p-toluene sulfonic acid | 170° C. × 25 sec | Tacky (not cured) | 50 (Down to Metal) |
| 2 | Zn(DDBSA)$_2$ | 170° C. × 25 sec | 82 | 100$^+$ |
| 5 | Zn(p-TSA)$_2$ | 170° C. × 25 sec | 85 | 100$^+$ |
| 6 | Zn(methane sulfonate)$_2$ Zn(MSA)$_2$ | 170° C. × 25 sec | 85 | 100$^+$ |
| 11 | Al(DDBSA)$_3$ | 170° C. × 25 sec | 95 | 100$^+$ |
| 12 | Ti(DDBSA)$_4$ | 170° C. × 25 sec | 92 | 100$^+$ |
| 13 | Zr(DDBSA)$_4$ | 170° C. × 25 sec | 95 | 100$^+$ |

TABLE 4

| Example | Catalysts | Bake Schedule | Pendulum Hardness | MEK Double Rubs |
|---|---|---|---|---|
| 1 | Amine Blocked p-TSA | 154° C. × 25 sec | Tacky (not cured) | 25 (Down to Metal) |
| 2 | Zn(DDBSA)$_2$ | 154° C. × 25 sec | 65 | 100+ |
| 11 | Al(DDBSA)$_3$ | 154° C. × 25 sec | 75 | 100+ |
| 12 | Ti(DDBSA)$_4$ | 154° C. × 25 sec | 65 | 100+ |
| 13 | Zr(DDBSA)$_4$ | 154° C. × 25 sec | 60 | 100+ |

TABLE 5

| Examples | Catalysts | Viscosity (Initial; cps) | Viscosity (Heat Age: 60° C. × 20 Hours; cps) |
|---|---|---|---|
| 1 | Amine Blocked p-TSA | 214 | 213 |
| 2 | Zn(DDBSA)$_2$ | 195 | 215 |
| 11 | Al(DDBSA)$_3$ | 204 | 215 |
| 12 | Ti(DDBSA)$_4$ | 198 | 223 |
| 13 | Zr(DDBSA)$_4$ | 197 | 222 |

Cure Studies in a Pigmented PE/Melamine Coil System

A pigmented coating formulation was prepared by blending the grind paste with the letdown described in TABLE 6. The pigmented coating formulations were catalyzed with metal sulfonate catalysts (25% active) listed in TABLE 7 at a concentration of 0.5% of active catalyst based on total resin solids. Films were cast on pretreated steel panels at a dry film thickness of approximately 25 μm. and baked in a coil oven for 25 seconds at peak metal temperature (PMT) of 170° C. The T-bend test, results shown in Table 8, is to evaluate adhesion and flexibility of organic coatings applied to metal no thicker than 0.025 in or 0.64 mm, using an impact-type wedge bend test apparatus, as described in ASTM D 4145. Prepainted panels are bent 180° around progressively more thicknesses of metal or larger diameter dies, the end point being when failures no longer occur. The panels are examined at low magnification (5 to 103) after each bend for fracture of the coating (cracking) and, for loss of adhesion pickoff, by means of a tape pull-off test.

Examples 14-17 demonstrate that catalysts of the current invention are effective in providing lower temperature cure in polyester/melamine pigmented coil coatings and yield flexible cured film with superior adhesion as demonstrated by the T-bend tests.

TABLE 6

Liquid coating compositions for Examples 14-17 (amounts in % by weight):

| | Examples | | | |
|---|---|---|---|---|
| | 14 | 15 | 16 | 17 |
| GRIND PASTE | | | | |
| Polymac 220-1935 | 19.30 | 19.30 | 19.30 | 19.30 |
| Disperbyk 110 (Dispersant) | 1.18 | 1.18 | 1.18 | 1.18 |
| Ti-Pure R-900 (Titanium Dioxide) | 29.52 | 29.52 | 29.52 | 29.52 |
| LETDOWN | | | | |
| Polymac 220-1935 | 29.00 | 29.00 | 29.00 | 29.00 |
| Resimene 747 | 5.72 | 5.72 | 5.72 | 5.72 |
| EEP | 5.08 | 5.08 | 5.08 | 5.08 |
| Xylene | 10.00 | 10.00 | 10.00 | 10.00 |
| Byk 310 | 0.20 | 0.20 | 0.20 | 0.20 |
| Catalysts | | | | |
| $Zn(DDBSA)_2$ | 0.74 | 0 | 0 | 0 |
| $Al(DDBSA)_3$ | 0 | 0.74 | 0 | 0 |
| $Ti(DDBSA)_4$ | 0 | 0 | 0.74 | 0 |
| $Zr(DDBSA)_4$ | 0 | 0 | 0 | 0.74 |

TABLE 7

| Examples | Bake Schedule | MEK Double Rubs (Initial; Without Heat Age) | MEK Double Rubs (Heat Age: 50° C. × 4 Weeks) |
|---|---|---|---|
| 14 | 170° C. × 25 sec | 100+ | 100+ |
| 15 | 170° C. × 25 sec | 100+ | 100+ |
| 16 | 170° C. × 25 sec | 100+ | 100+ |
| 17 | 170° C. × 25 sec | 100+ | 100+ |

TABLE 8

| Examples | Bake Schedule | T-Bend Test (T0) | T-Bend Test (T2) |
|---|---|---|---|
| 14 | 170° C. × 25 sec | No Picking | No Cracking |
| 15 | 170° C. × 25 sec | No Picking | No Cracking |
| 16 | 170° C. × 25 sec | No Picking | No Cracking |
| 17 | 170° C. × 25 sec | No Picking | No Cracking |

Corrosion Protection

A water reducible alkyd primer was prepared by blending the grind paste with the letdown described in TABLE 9. The alkyd primers were mixed with corrosion inhibitors listed in TABLE 9 at a concentration of 2.0% based on total formula weight. Films were cast on polished cold rolled steel panels and dried under an ambient air for 2 weeks to yield a dry film thickness of approximately 25 μm. Coated specimens are subjected to Salt spray (ASTM B 117) and Humidity exposure (ASTM D 2247) to determine the corrosion resistance of the coating system incorporated with the metal sulfonates of the current invention.

TABLE 9

Liquid coating compositions for Examples 18-22 (amounts in % by weight):

| | Examples | | | | |
|---|---|---|---|---|---|
| | 18 (Control) | 19 | 20 | 21 | 22 |
| GRIND PASTE | | | | | |
| KELSOL 3961 | 14.3 | 14.3 | 14.3 | 14.3 | 14.3 |
| Triethylamine | 0.8 | 0.8 | 0.8 | 0.8 | 0.8 |
| 2-Butoxyethanol | 1.6 | 1.6 | 1.6 | 1.6 | 1.6 |
| n-Butanol | 1.6 | 1.6 | 1.6 | 1.6 | 1.6 |
| BENTONE EW (2% in Water) | 13.0 | 13.0 | 13.0 | 13.0 | 13.0 |
| TI-PURE R902 | 10.8 | 10.8 | 10.8 | 10.8 | 10.8 |
| Barytes | 19.0 | 19.0 | 19.0 | 19.0 | 19.0 |
| RAVEN Black 1255 | 0.4 | 0.4 | 0.4 | 0.4 | 0.4 |
| OK 412 | 0.9 | 0.9 | 0.9 | 0.9 | 0.9 |
| Water | 14.0 | 14.0 | 14.0 | 14.0 | 14.0 |
| LETDOWN | | | | | |
| KELSOL 3961 | 4.7 | 4.7 | 4.7 | 4.7 | 4.7 |
| Triethylamine | 0.3 | 0.3 | 0.3 | 0.3 | 0.3 |
| 2-Butoxyethanol | 0.8 | 0.8 | 0.8 | 0.8 | 0.8 |
| Cobalt HYDROCURE II | 0.3 | 0.3 | 0.3 | 0.3 | 0.3 |
| Manganese HYDROCURE II7 | 0.6 | 0.6 | 0.6 | 0.6 | 0.6 |
| n-Butanol | 0.7 | 0.7 | 0.7 | 0.7 | 0.7 |
| Water | 15.3 | 15.3 | 15.3 | 15.3 | 15.3 |
| $Zn(DNNSA)_2$ | 0 | 2.0 | 0 | 0 | 0 |
| $Al(DNNSA)_3$ | 0 | 0 | 2.0 | 0 | 0 |
| $Ti(DNNSA)_4$ | 0 | 0 | 0 | 2.0 | 0 |
| $Zr(DNNSA)_4$ | 0 | 0 | 0 | 0 | 2.0 |

TABLE 10

| Examples | Salt Spray (1000 Hr) | Humidity (1000 Hr) |
|---|---|---|
| 18 | 4.0 mm Creepage | Blistering |
| 19 | 0.5 mm Creepage | No Blistering |
| 20 | 0.5 mm Creepage | No Blistering |
| 21 | 0.5 mm Creepage | No Blistering |
| 22 | 0.5 mm Creepage | No Blistering |

Examples 18-22 demonstrate that catalysts of the current invention impart superior corrosion protection to the liquid coating compositions prepared according to the invention.

Cure Studies in a Clear PE/Melamine OEM System

Clear OEM Coating Preparation: Polymac 232-2780 (hydroxyl functional polyester resin; 70% solids) and Resimene 755 (melamine; 100% solids) were homogeneously mixed with MIBK, xylene, n-butanol, and BYK-310 (leveling agent) to form a 55% resin solution tabulated in TABLE 11. The resin solutions were catalyzed with an amine blocked DDBSA and metal sulfonate catalysts (25% active) listed in TABLES 12-14 at a concentration of 0.5% of active catalyst based on total resin solids. Films were cast on pretreated steel panels at a dry film thickness of approximately 40 μm. and baked in a conventional oven for 20 minutes at 140° C. and 105° C., respectively. The degrees of cure for each catalyst system were determined by the pendulum hardness and MEK double rubs. In addition storage stability of the formulations at 60° C. was evaluated by measuring viscosity changes over time. Double rub procedure: MEK is applied to eight ply cheesecloth and rubbed across the specimen for 100+ rubs or less if paint fails earlier. This is described in Technical Bulletin 4 of the National Coil Coaters Association, Revised June 1996. The results of this study are shown on Tables 12-14 and show that metal sulfonate catalysts of the current invention are effective lower temperature catalysts for polyester/melamine clear OEM coatings. Even at distinctly lower baking temperatures and dwell time, completely crosslinked coatings were obtained. In addition fully formulated coatings containing these catalysts exhibit excellent storage stability.

TABLE 11

| Ingredients | % by weight |
|---|---|
| Polymac 232-2780 | 55.00 |
| Resimene 755 | 16.50 |
| MIBK | 10.00 |
| Xylene | 13.00 |
| n-Butanol | 5.30 |
| BYK-310 | 0.20 |
| Catalysts | 0.11 |

TABLE 12

| Examples | Catalysts | Bake Schedule | Pendulum Hardness | MEK Double Rubs |
|---|---|---|---|---|
| 23 | Amine Blocked DDBSA | 140° C. × 20 min | 111 | 100+ |
| 24 | $Zn(DDBSA)_2$ | 140° C. × 20 min | 111 | 100+ |
| 25 | $Al(DDBSA)_3$ | 140° C. × 20 min | 112 | 100+ |
| 26 | $Ti(DDBSA)_4$ | 140° C. × 20 min | 114 | 100+ |
| 27 | $Zr(DDBSA)_4$ | 140° C. × 20 min | 112 | 100+ |

TABLE 13

| Examples | Catalysts | Bake Schedule | Pendulum Hardness | MEK Double Rubs |
|---|---|---|---|---|
| 23 | Amine Blocked DDBSA | 105° C. × 20 min | 71 | 15 (Down to Metal) |
| 24 | $Zn(DDBSA)_2$ | 105° C. × 20 min | 95 | 100+ |
| 25 | $Al(DDBSA)_3$ | 105° C. × 20 min | 112 | 100+ |
| 26 | $Ti(DDBSA)_4$ | 105° C. × 20 min | 114 | 100+ |
| 27 | $Zr(DDBSA)_4$ | 105° C. × 20 min | 113 | 100+ |

TABLE 14

| Examples | Catalysts | Viscosity (Initial; cps) | Viscosity Heat Age: (60° C. × 20 Hours; cps) |
|---|---|---|---|
| 23 | Amine Blocked DDBSA | 10.8 | 11.0 |
| 24 | $Zn(DDBSA)_2$ | 12.5 | 12.9 |
| 25 | $Al(DDBSA)_3$ | 12.9 | 13.1 |
| 26 | $Ti(DDBSA)_4$ | 13.1 | 13.3 |
| 27 | $Zr(DDBSA)_4$ | 13.0 | 13.1 |

Cure Studies in a Clear Carbamate/Melamine System
Clear Coating Preparation: Carbamate resin (carbamate functional polyester resin; 70% solids; based on U.S. Pat. No. 7,226,971, S. Ramesh et. al., BASF, Example 2) and Resimene 755 (melamine; 100% solids) were homogeneously mixed with MIBK, xylene, n-butanol, and BYK-310 (leveling agent) to form a 55% resin solution tabulated in TABLE 15. The resin solutions were catalyzed with an amine blocked DDBSA and metal sulfonate catalysts (25% active) listed in TABLES 16-18 at a concentration of 0.5% of active catalyst based on total resin solids. Films were cast on pretreated steel panels at a dry film thickness of approximately 40 μm. and baked in a conventional oven for 20 minutes at 140° C., and 105° C., respectively. The degrees of cure for each catalyst system were determined by the pendulum hardness and MEK double rubs. In addition storage stability of the formulations at 60° C. was evaluated by measuring viscosity changes over time.

Double rub procedure: MEK is applied to eight ply cheesecloth and rubbed across the specimen for 100+ rubs or less if paint fails earlier. This is described in Technical Bulletin 4 of the National Coil Coaters Association, Revised June 1996.

The results of this study are shown on Tables 16-18 and show that metal sulfonate catalysts of the current invention are effective lower temperature catalysts for carbamate/melamine clear coatings. Even at distinctly lower baking temperatures and dwell time, completely crosslinked coatings were obtained. In addition fully formulated coatings containing these catalysts exhibit excellent storage stability.

TABLE 15

| Ingredients | % by weight |
|---|---|
| Carbamate Resin | 55.00 |
| Resimene 755 | 16.50 |
| MIBK | 10.00 |
| Xylene | 13.00 |
| n-Butanol | 5.30 |
| BYK-310 | 0.20 |
| Catalysts | 0.11 |

TABLE 16

| Examples | Catalysts | Bake Schedule | Pendulum Hardness | MEK Double Rubs |
|---|---|---|---|---|
| 28 | Amine Blocked DDBSA | 140° C. × 20 min | 97 | 100+ |
| 29 | $Zn(DDBSA)_2$ | 140° C. × 20 min | 96 | 100+ |
| 30 | $Al(DDBSA)_3$ | 140° C. × 20 min | 97 | 100+ |
| 31 | $Ti(DDBSA)_4$ | 140° C. × 20 min | 98 | 100+ |
| 32 | $Zr(DDBSA)_4$ | 140° C. × 20 min | 98 | 100+ |

TABLE 17

| Examples | Catalysts | Bake Schedule | Pendulum Hardness | MEK Double Rubs |
|---|---|---|---|---|
| 28 | Amine Blocked DDBSA | 105° C. × 20 min | 63 | 10 (Down to Metal) |
| 29 | $Zn(DDBSA)_2$ | 105° C. × 20 min | 83 | 100+ |
| 30 | $Al(DDBSA)_3$ | 105° C. × 20 min | 98 | 100+ |
| 31 | $Ti(DDBSA)_4$ | 105° C. × 20 min | 97 | 100+ |
| 32 | $Zr(DDBSA)_4$ | 105° C. × 20 min | 96 | 100+ |

TABLE 18

| Examples | Catalysts | Viscosity (Initial; cps) | Viscosity (Heat Age: 60° C. × 20 Hours; cps) |
|---|---|---|---|
| 28 | Amine Blocked DDBSA | 13.3 | 13.5 |
| 29 | $Zn(DDBSA)_2$ | 14.7 | 15.0 |
| 30 | $Al(DDBSA)_3$ | 14.2 | 15.1 |
| 31 | $Ti(DDBSA)_4$ | 15.2 | 15.5 |
| 32 | $Zr(DDBSA)_4$ | 15.6 | 15.7 |

While the present invention has been described herein with some specificity, and with reference to certain embodiments thereof, those of ordinary skill in the art will recognize numerous variations, modifications and substitutions that can be made, and which are within the scope and spirit of the invention. It is intended that such modifications and variations be within the scope of the invention as described and claimed herein, and that the invention be limited only by the scope of the claims which follow, and that such claims be interpreted as broadly as is reasonable.

The invention claimed is:

1. A curable coating composition capable of acid catalyzed crosslinking, comprising a polyester polyol resin, an aminoplast resin curing agent, and an amount of one or more metal sulfonates of Formula (I) through (V) effective to catalyze crosslinking between the polyester polyol resin and the aminoplast resin curing agent:

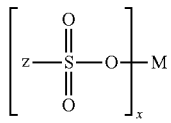

Formula (I)

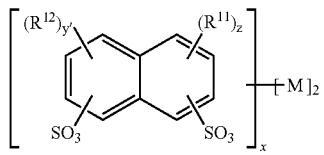

Formula (II)

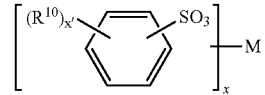

Formula (III)

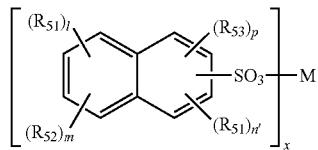

Formula (IV)

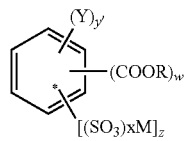

Formula (V)

wherein M is selected from Ti, Al, Zr, and W; x is an integer from 1 to 6;
wherein for Formula (I), Z is an organic radical selected from the group consisting of a linear, branched, saturated or unsaturated alkyl having from 1 to 40 carbon atoms, a cycloalkyl having from 5 to 40 carbon atoms, which alkyl and cycloalkyl may optionally be substituted, an aryl having from 6 to 40 carbon atoms, an aralkyl having from 7 to 9 carbon atoms, wherein the aralkyl optionally may be substituted with an alkyl having from 1 to 36 carbon atoms, and the organic radical being connected to the sulfur atom by a carbon atom;
wherein for Formula (II), each of $R^{11}$ and $R^{12}$ independently are the same or different and are linear or branched alkyl group having up to 40 carbon atoms, which is optionally substituted, y is 0 to 3, and z is 0 to 3 with the proviso that y+z is 1 to 4;
wherein for Formula (III), $R^{10}$ is an alkyl group having up to 40 carbon atoms and x' is 1 or 2,
wherein for Formula (IV), $R_{51}$, $R_{52}$, $R_{53}$ and $R_{54}$ are independently linear or branched hydrocarbyl groups having up to 40 carbon atoms; l, m, n' and p are integers from 0 to 4 and the sum of l+m+n'+p is at least 1;
wherein for Formula (V), Y is a radical independently selected from the group consisting of an alkyl having from 1 to 20 carbon atoms, a cycloalkyl having from 3 to 20 carbon atoms, an aryl having from 6 to 18 carbon atoms, a halogen, an alkoxy having from 1 to 12 carbon atoms, a hydroxyl, and an aryloxy of from 6 to 18 carbon atoms; y' is an integer from 0 to 4, w is an integer from 0 to 2, and z is an integer from 1 to 3, with the proviso that when w is 0, y is an integer from 1 to 4 and z is an integer from 2 to 3 and when y is 0, w is an integer from 1 to 2 and z is an integer from 1 to 3;
R is independently selected from the group consisting of hydrogen, an alkyl having from 1 to 20 carbon atoms, a cycloalkyl having from 3 to 20 carbon atoms, and an aryl having from 6 to 18 carbon atoms,
wherein the one or more metal sulfonates is one or more sulfonates of a metal selected from the group consisting of aluminum, titanium, zirconium and tungsten, and
wherein the coating composition is a curable coating composition.

2. The curable coating composition according to claim 1, further comprising one or more of sulfonic acids of Formula (VI) through (X):

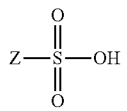

Formula (VI)

wherein for Formula (VI), Z is an organic radical selected from the group consisting of a linear, branched, saturated or unsaturated alkyl having from 1 to 40 carbon atoms, a cycloalkyl having from 5 to 40 carbon atoms, an aryl having from 6 to 40 carbon atoms, an aralkyl having from 7 to 9 carbon atoms, wherein the aralkyl optionally is substituted with an alkyl having from 1 to 36 carbon atoms,

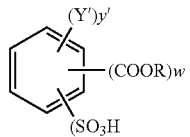

Formula (VII)

wherein for Formula (VII), Y' is a radical independently selected from the group consisting of an alkyl having from 1 to 20 carbon atoms, a cycloalkyl having from 3 to 20 carbon atoms, an aryl having from 6 to 18 carbon atoms, a halogen, an alkoxy, a hydroxyl, and an aryloxy; wherein y' is an integer from 0 to 4, w is an integer from 0 to 2, and x is an integer from 1 to 3, with the proviso that when w is 0, y' is an integer from 1 to 4 and the proviso that when y' is 0, w is an integer from 1 to 2; wherein R is independently selected from the group consisting of hydrogen, an alkyl having from 1 to 20 carbon atoms, a cycloalkyl having from 3 to 20 carbon atoms, and an aryl having from 6 to 18 carbon atoms;

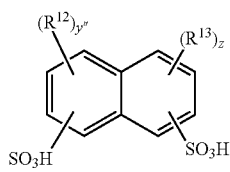

Formula (VIII)

wherein for Formula (VIII), each of $R^{13}$ and $R^{12}$ independently are the same or different and are a linear or branched alkyl group having from 6 to 40 carbons, y" is 0 to 3, z is 0 to 3, subscripts y"+z is 1 to 4;

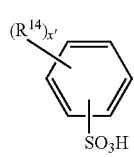

Formula (IX)

wherein for Formula (IX), $R^{14}$ is H or an alkyl group having up to 40 carbon atoms, and x' is an integer from 0 to 2;

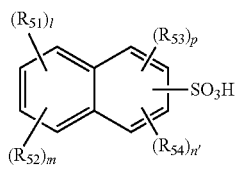

Formula (X)

wherein for Formula (X), $R_{51}$, $R_{52}$, $R_{53}$ and $R_{54}$ are independently selected from the group consisting of hydrogen or linear or branched hydrocarbyl groups having about 6 to about 40 carbon atoms; with the proviso that when subscripts l, m, n' and p are each integers from 0 to 4, the sum of l+m+n'+p is at least 1 and with the proviso that when $R_{51}$, $R_{52}$, $R_{53}$ and $R_{54}$ are independently hydrogen when l, m, n', or p is 0.

3. The curable coating composition according to claim 1, wherein Z is selected from the group consisting of a linear or branched, saturated or unsaturated perfluoro alkyl of from 1 to 24 carbon atoms, an cycloalkyl having from 5 to 12 carbon atoms, an aryl having from 6 to 12 carbon atoms; and an aralkyl having from 7 to 9 carbon atoms;
  wherein each of $R^{11}$ and $R^{12}$, $R_{51}$, $R_{52}$, $R_{53}$ and $R_{54}$ are independently selected from linear or branched alkyl groups from 6 to 24 carbon atoms;
  wherein $R^{10}$ is an alkyl group having from 1 to 24 carbon atoms; and
  wherein Y is an alkyl having from 1 to 12 carbon atoms, a cycloalkyl having from, 5 to 12 carbon atoms, an aryl having from 6 to 18 carbon atoms, a halogen, an alkoxy having from 1 to 12 carbon atoms, a hydroxyl, and an aryloxy of 6 to 18 carbon atoms; and wherein R is independently selected from the group consisting of a hydrogen, an alkyl having from 1 to 20 carbon atoms, a cycloalkyl having from 3 to 20 carbon atoms, and an aryl having from 6 to 18 carbon atoms.

4. The curable coating composition according to claim 1, comprising a mixture of two or more of the metal sulfonates of Formulas (I), (II), (III) and (IV).

5. The composition of claim 1, wherein the polyester polyol has a hydroxyl functionality of at least two.

6. The composition of claim 1, wherein the aminoplast resin comprises a melamine-formaldehyde condensation product.

7. The composition of claim 6, wherein the aminoplast resin comprises an at least partially alkylated melamine-formaldehyde condensation product.

8. The composition of claim 1, wherein the one or more metal sulfonates includes aluminum dodecylbenzene sulfonate.

9. The composition of claim 2, wherein the one or more sulfonic acids comprises at least one of the group consisting of methanesulfonic acid, para-toluenesulfonic acid, ortho-carboisopropoxybenzene sulfonic acid, ortho-carbomethoxybenzene sulfonic acid, benzenesulfonic acid, various alkylated benzenesulfonic acids, various substituted alkylated naphthalene sulfonic acids, dinonylnaphthalene mono and di sulfonic acids, and didodecylnaphthalene mono and di sulfonic acids.

10. The composition of claim 1, comprising about 10 to 90% by weight, based on the weight of the composition, resin solids and from about 0.1 to 5 wt % of the catalyst.

11. The composition of claim 10, further comprising from about 1 to about 50 wt % of a pigment and optionally from about 1 to 10% by weight of a dispersant based on the weight of pigment.

12. A base coating, a primer coating or a clear coating comprising the composition of claim 1.

13. The cured composition of claim 1.

14. A process for coating a substrate with a high solids, organic solvent based, sprayable coating composition, comprising the steps of:
  a) spraying a substrate electrostatically with an organic solvent based, sprayable coating composition according to claim 1, wherein the coating composition optionally further comprises an anticorrosive pigment; and
  b) baking the coated substrate of step (a) at a temperature of about 80° C. to about 350° C. to form a cured coating.

15. A method for forming a multi-layer coating comprising:
  i) applying, sequentially, a layer of a primer coating composition, applying a layer of a base coating composition, and a layer of a clear coating composition on a substrate; and
  ii) curing, simultaneously, in a single bake of all the applied three layers, wherein at least one of the primer coating compositions, the base coating composition, and the clear coating composition comprises a coating composition according to claim 1.

16. The curable coating composition of claim 1, wherein the one or more metal sulfonates is selected from the group consisting of Al(Dodecylbenzenesulfonate)$_3$, Ti(Dodecylbenzenesulfonate)$_4$, and Zr(Dodecylbenzenesulfonate)$_4$, and tungsten (Dodecylbenzenesulfonate)$_4$.

17. The curable coating composition of claim 1, wherein the one or more metal sulfonates includes Al(Dodecylbenzenesulfonate)$_3$.

18. The curable coating composition of claim 1, wherein the aminoplast resin includes a melamine-formaldehyde condensation product, and wherein the one or more metal sulfonates includes Al(Dodecylbenzenesulfonate)$_3$.

* * * * *